(12) United States Patent
Kondo

(10) Patent No.: US 7,477,786 B2
(45) Date of Patent: Jan. 13, 2009

(54) DATA CONVERSION DEVICE, DATA CONVERSION METHOD, LEARNING DEVICE, LEARNING METHOD, PROGRAM, AND RECORDING MEDIUM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/827,768

(22) Filed: Jul. 13, 2007

(65) Prior Publication Data

US 2007/0263925 A1 Nov. 15, 2007

Related U.S. Application Data

(62) Division of application No. 10/482,983, filed as application No. PCT/JP03/05489 on Apr. 28, 2003, now Pat. No. 7,372,997.

(30) Foreign Application Priority Data

May 8, 2002 (JP) ............... 2002-132331

(51) Int. Cl.
*G06K 9/62* (2006.01)
(52) U.S. Cl. ............... 382/225; 382/155; 714/746
(58) Field of Classification Search ............ 382/225, 382/224, 132, 173, 190, 208, 248, 251, 258, 382/275, 236, 238, 233, 155, 157; 370/320, 370/335, 342; 375/152, 326, 130, 343, 240, 375/240.01, 240.12, 240.14, 240.24, 240.25, 375/242, 240.21; 365/189.05, 185.22, 185.17, 365/185.12, 201, 194, 185.18; 714/721, 714/718, 746; 368/10; 340/991, 990; 342/457; 455/231, 343.2; 348/384, 390, 397, 399, 348/403, 405, 408–413, 415, 420, 421

See application file for complete search history.

(56) References Cited

U.S. PATENT DOCUMENTS 5,666,164 A * 9/1997 Kondo et al. ............... 348/441

(Continued)

FOREIGN PATENT DOCUMENTS

EP 0 571 180 11/1993

(Continued)

OTHER PUBLICATIONS

Sheppard D G et al.:"A Vector Quantizer For Image Restoration" IEEE Transactions On Image Processing, IEEE Service Center, Piscataway, NJ, US, vol. 7, No. 1, Jan. 1, 1998, pp. 119-124, XP000727381 ISSN: 1057-7149.

(Continued)

*Primary Examiner*—Sheela C Chawan
(74) *Attorney, Agent, or Firm*—Frommer Lawrence & Haug LLP; William S. Frommer; Ellen Marcie Emas

(57) ABSTRACT

The present invention relates to a data conversion device and a data conversion method, in which HD image data having an image quality higher than that of the original SD image data can be obtained, to a learning device therefor, to a learning method therefor, to a program therefor, and to a recording medium therefor. A data generation section 3 generates HD image data on the basis of the class of a class tap extracted from the SD image data. On the other hand, a correction level calculation section 4 detects features of the class tap based on the class tap and the class thereof, and determines the correction level for correcting the HD image data on the basis of the features. Then, a data correction section 5 corrects the HD image data output by the data generation section 3 on the basis of the correction level. The present invention can be applied to, for example, a television receiver for receiving television broadcasting signals and displaying images.

8 Claims, 28 Drawing Sheets

U.S. PATENT DOCUMENTS

| | | | |
|---|---|---|---|
| 5,940,132 A | 8/1999 | Kondo et al. | |
| 6,198,770 B1 * | 3/2001 | Kondo | 375/240.14 |
| 6,233,019 B1 | 5/2001 | Kondo et al. | |
| 6,323,905 B1 * | 11/2001 | Kondo et al. | 348/441 |
| 7,174,051 B2 * | 2/2007 | Kondo et al. | 382/299 |
| 2002/0031267 A1 | 3/2002 | Kondo | |

FOREIGN PATENT DOCUMENTS

| | | |
|---|---|---|
| EP | 0 635 978 | 6/1994 |
| EP | 0 895 191 | 2/1999 |
| JP | 7-75066 | 3/1995 |
| JP | 7-154642 | 6/1995 |
| JP | 9-83961 | 3/1997 |
| JP | 10-164520 | 6/1998 |
| JP | 11-4413 | 1/1999 |
| JP | 11-55630 | 2/1999 |
| JP | 11-191880 | 7/1999 |
| WO | WO 94/14278 | 6/1994 |

OTHER PUBLICATIONS

A. Gersho, R. Gray:"Vector Quantization and Signal Compression" 1995, Kluwer Academic Publishers, USA, XP002495215 ISBN: 0-7923-9181-0.

Lee and D L Neuhoff D H:"Conditionally corrected two-stage vector quantization" Conference Info: Conf. Information Sciences and Systems, Mar. 1, 1990, pp. 802-806, XP001538625.

Freeman W T et al:"Example-based super-resolution" IEEE Computer Graphics and Applications, IEEE Service Center, New York, NY, US, vol. 22, No. 2, Mar. 1, 2002, pp. 56-65, XP011094241 ISSN: 0272-1716.

Gersho A : "Optimal nonlinear interpolative vector quantization" IEEE Transactions on Communications USA, vol. 38, No. 9, Sep. 1990, pp. 1285-1287, XP002495214 ISSN: 0090-6778.

* cited by examiner

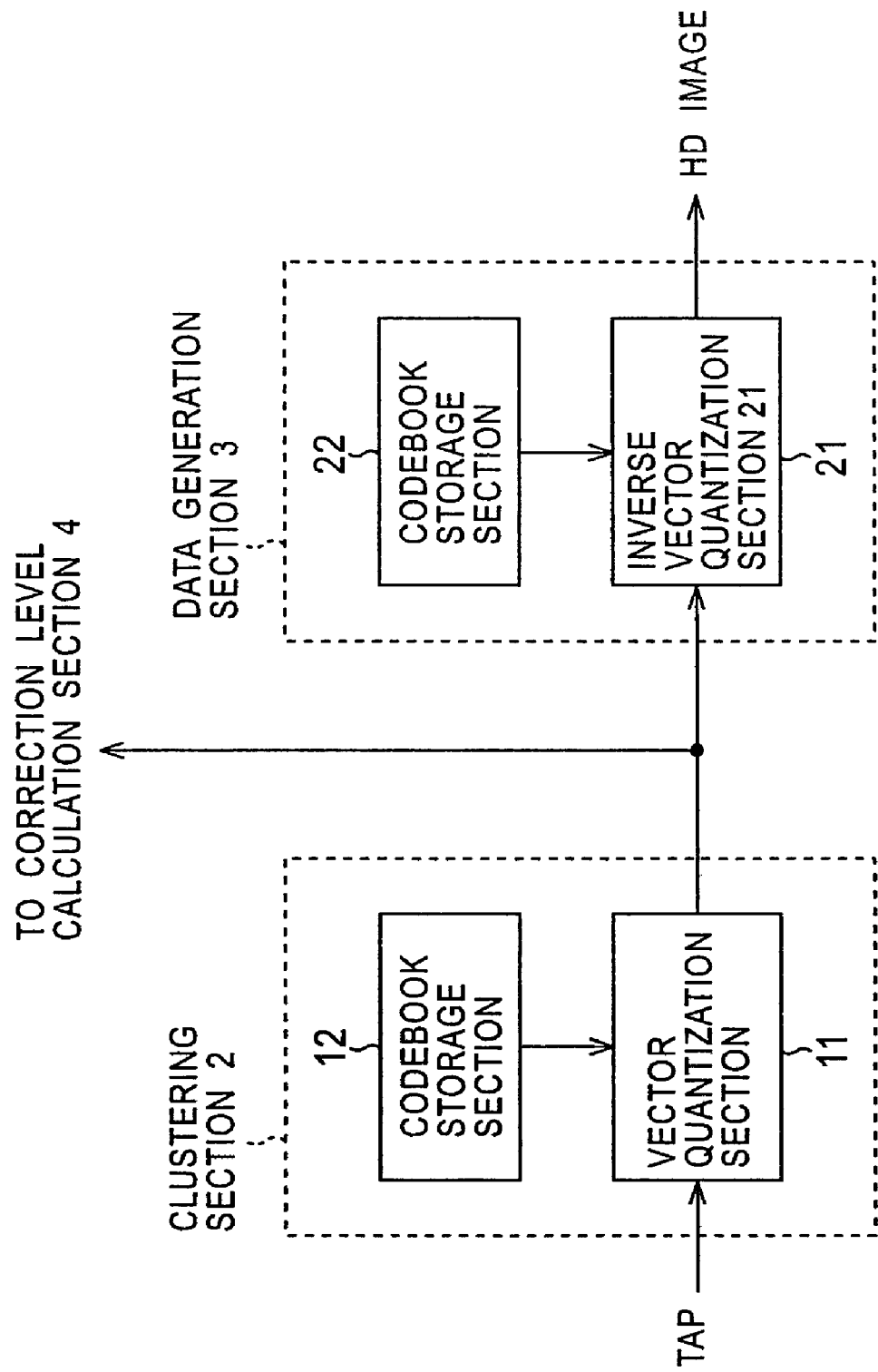

FIG. 5A

| CODE VECTOR ($P_1$, $P_2$) | CODE #c |
|---|---|
| (100, 100) | 0 |
| (50, 150) | 1 |
| (0, 200) | 2 |
| ⋮ | ⋮ |

FIG. 5B

| CODE #c | CODE VECTOR ($Q_1$, $Q_2$, $Q_3$, $Q_4$) |
|---|---|
| 0 | (100, 100, 100, 100) |
| 1 | (50, 100, 150, 200) |
| 2 | (0, 100, 200, 300) |
| ⋮ | ⋮ |

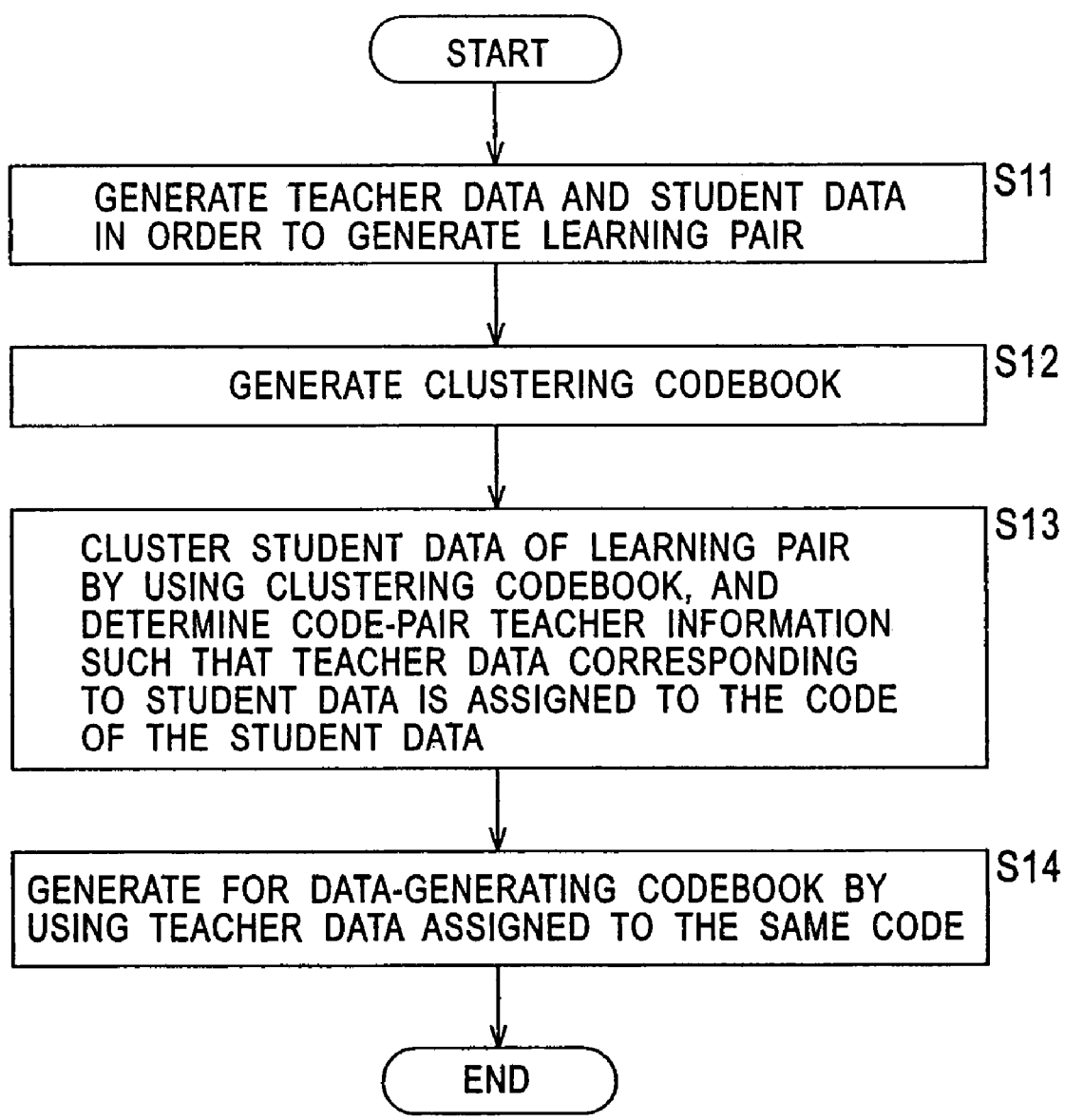

FIG. 8A

| TEACHER DATA $(q_1, q_2, q_3, q_4)$ | STUDENT DATA $(p_1, p_2)$ |
|---|---|
| $(q_1(1), q_2(1), q_3(1), q_4(1))$ | $(p_1(1), p_2(2))$ |
| $(q_1(2), q_2(2), q_3(2), q_4(2))$ | $(p_1(2), p_2(2))$ |
| ⋮ | ⋮ |
| $(q_1(N), q_2(N), q_3(N), q_4(N))$ | $(p_1(N), p_2(N))$ |

FIG. 8B

| TEACHER DATA $(q_1, q_2, q_3, q_4)$ | CODE OF CORRESPONDING STUDENT DATA |
|---|---|
| $(q_1(1), q_2(1), q_3(1), q_4(1))$ | $C_1$ |
| $(q_1(2), q_2(2), q_3(2), q_4(2))$ | $C_2$ |
| ⋮ | ⋮ |
| $(q_1(N), q_2(N), q_3(N), q_4(N))$ | $C_N$ |

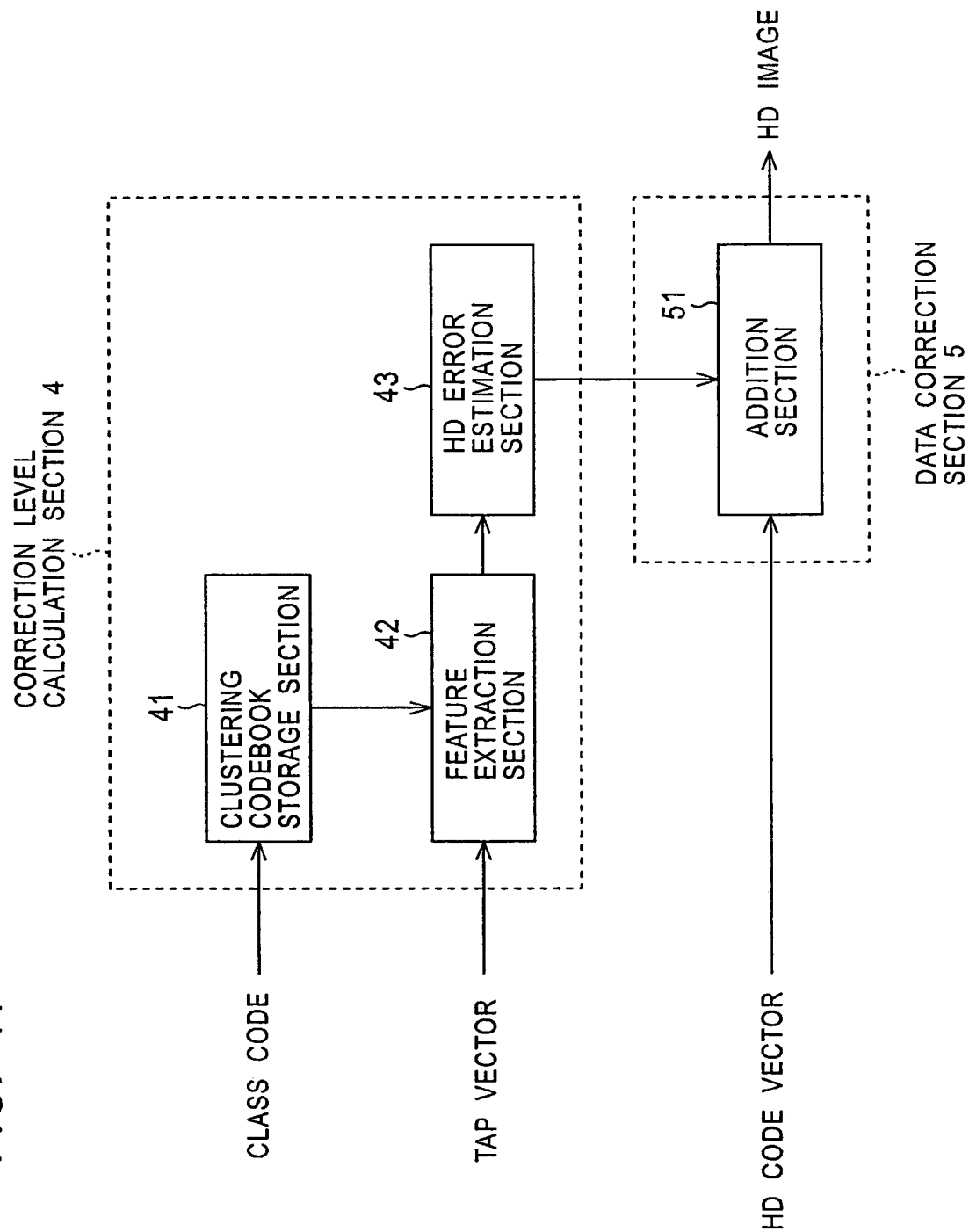

FIG. 15

| SD ERROR $(\Delta p_1, \Delta p_2)$ | HD ERROR $(\Delta q_1, \Delta q_2, \Delta q_3, \Delta q_4)$ |
|---|---|
| . . . | . . . |
| . . . | . . . |
| | |

SD IMAGE SPACE

HD IMAGE SPACE

|  | COEFFICIENT OF $\Delta p_1$ | COEFFICIENT OF $\Delta p_2$ |
|---|---|---|
| $\Delta q_1$ | $w_1^{(1)}$ | $w_2^{(1)}$ |
| $\Delta q_2$ | $w_1^{(2)}$ | $w_2^{(2)}$ |
| $\Delta q_3$ | $w_1^{(3)}$ | $w_2^{(3)}$ |
| $\Delta q_4$ | $w_1^{(4)}$ | $w_2^{(4)}$ |

FIG. 20A

| CODE VECTOR (P1, P2) | CODE #C |
|---|---|
| (P1(0), P2(0)) | 0 |
| (P1(1), P2(1)) | 1 |
| (P1(2), P2(2)) | 2 |
| ⋮ | ⋮ |

FIG. 20B

| CODE #C | SD ANGLE $\theta_{SD}$ |
|---|---|
| 0 | $\theta_{SD}(0)(=\tan^{-1}(P_2(0)-P_1(0)))$ |
| 1 | $\theta_{SD}(1)(=\tan^{-1}(P_2(1)-P_1(1)))$ |
| 2 | $\theta_{SD}(2)(=\tan^{-1}(P_2(2)-P_1(2)))$ |
| ⋮ | ⋮ |

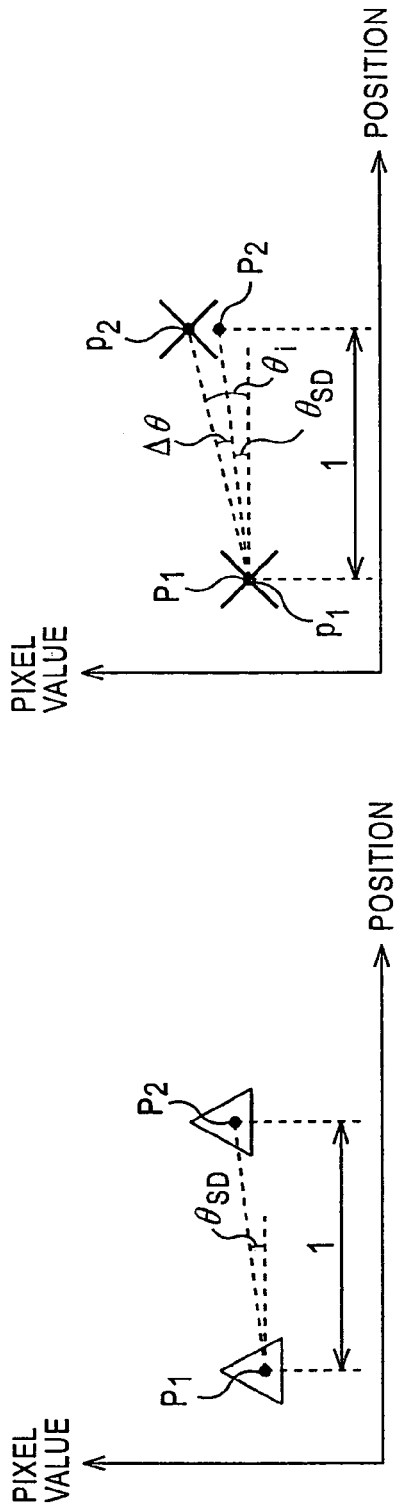
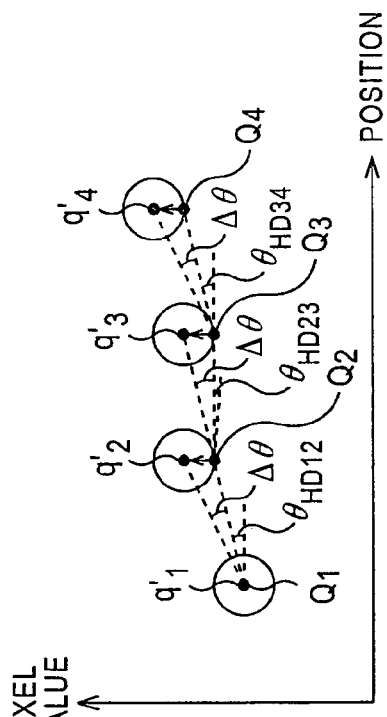
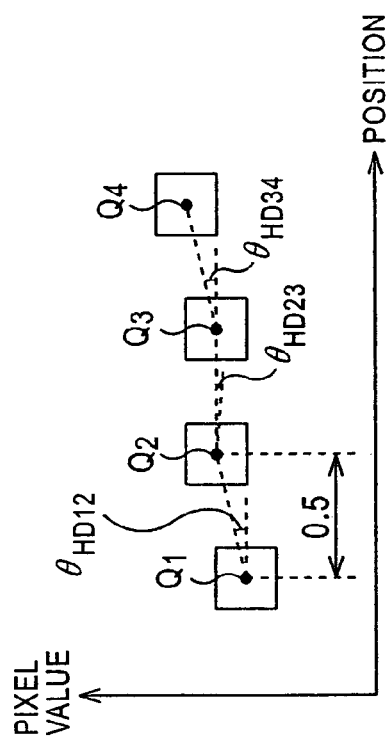
FIG. 21A  FIG. 21B  FIG. 21C  FIG. 21D

FIG. 26

| SD ERROR ANGLE $\Delta\theta_{SD}$ | HD ERROR ANGLE ($\Delta\theta_{HD12}, \Delta\theta_{HD23}, \Delta\theta_{HD34}$) |
|---|---|
| . . . | . . . |
| . . . | . . . |
| ⋮ | ⋮ |

FIG. 27

| | COEFFICIENT a | COEFFICIENT b |
|---|---|---|
| $\Delta\theta_{HD12}$ | $a_{12}$ | $b_{12}$ |
| $\Delta\theta_{HD23}$ | $a_{23}$ | $b_{23}$ |
| $\Delta\theta_{HD34}$ | $a_{34}$ | $b_{34}$ |

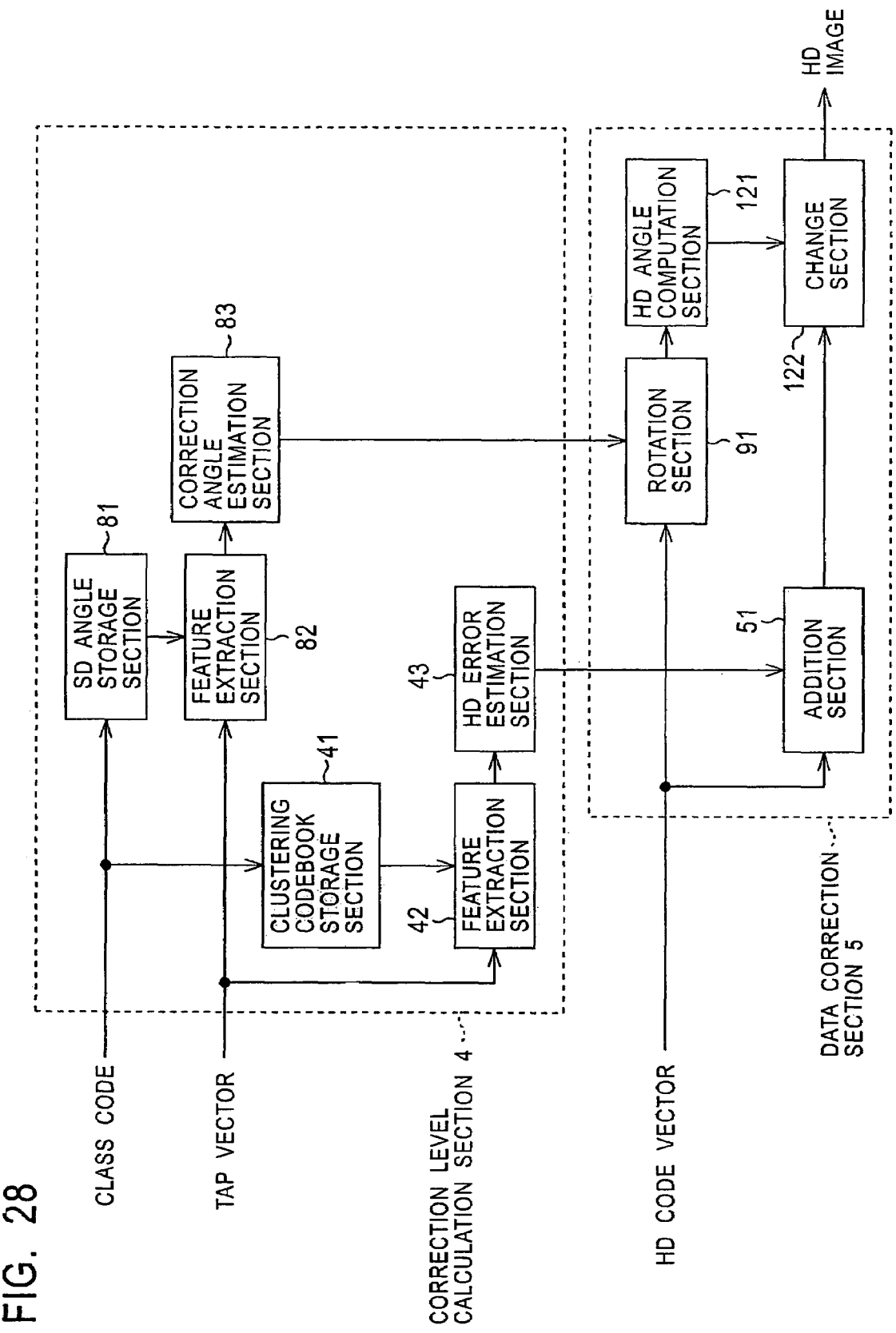

DATA CONVERSION DEVICE, DATA CONVERSION METHOD, LEARNING DEVICE, LEARNING METHOD, PROGRAM, AND RECORDING MEDIUM

This is a division of application Ser. No. 10/482,983, filed Jan. 6, 2004, now U.S. Pat. No. 7,372,997 pursuant to 35 USC 371 and based on International Application PCT/JP03/05489, filed Apr. 28, 2003, which is entitled to the priority filing date of Japanese application 2002-132331, filed in Japan on May 8, 2002, the entirety of which is incorporated herein by reference.

TECHNICAL FIELD

The present invention relates to a data conversion device, a data conversion method, a learning device, a learning method, a program, and a recording medium. More particularly, the present invention relates to a data conversion device and a data conversion method, in which, for example, low-resolution image data can be converted into high-resolution image data, to a learning device therefor, to a learning method therefor, to a program therefor, and to a recording medium therefor.

BACKGROUND ART

An image processing method is known in which, regarding, for example, image data, the image data is classified (clustered) into one of a plurality of classes and a process corresponding to the class is performed.

According to such an image processing method, for example, when clustering is to be performed on the basis of the activity of image data, image data having high activity, such as image data with large changes, and image data having low activity, such as flat image data, can be clustered into different classes. As a result, image processing appropriate for image data having high activity and image data having low activity can be performed thereon.

According to the above-described image processing, image processing suitable for image data of a class can be performed for each image data clustered for each class. Therefore, theoretically, the larger the number of classes, the more appropriate the processing that can be performed on image data clustered into each class.

However, when the number of classes becomes huge, the number of patterns of image processing performed according to the class becomes huge, and the device becomes larger. That is, for example, in the manner described above, when clustering is performed on the basis of activity, by providing the same number of classes as the number of values that the activity can take, image processing appropriate for the activity can be performed on the image data of each activity. However, for example, when N difference values of the adjacent pixels of pixels arranged in the horizontal direction are used as the activity, if the difference value is of K bits, the total number of classes becomes huge, namely, $(2^K)^N$.

For this reason, clustering is performed by using some kind of a compression process, such as ADRC (Adaptive Dynamic Range Coding).

More specifically, in the clustering using ADRC, N difference values, such as those described above, as data used for clustering (hereinafter referred to as a "class tap"), are subjected to an ADRC process, and a class is determined according to the ADRC code obtained thereby.

In K-bit ADRC, for example, the maximum value MAX and the minimum value MIN of the values of the data forming the class taps are detected, DR=MAX−MIN is assumed to be a local dynamic range of a set, and based on this dynamic range DR, the values of the data forming the class taps are requantized into K bits. That is, the minimum value MIN is subtracted from the value of the data forming the class taps, and the subtracted value is divided (quantized) by $DR/2^K$. A bit sequence such that the K-bit values of the data forming the class taps, obtained in the above-described way, are arranged in a predetermined order is output as an ADRC code. Therefore, when the class taps are subjected to, for example, a 1-bit ADRC process, after the minimum value MIN is subtracted from each piece of data forming the class taps, the data is divided by (maximum value MAX−minimum value MIN)/2, and as a result, each piece of data is formed as 1 bit (binarized). Then, a bit sequence such that the 1-bit data is arranged in a predetermined order is output as an ADRC code.

Here, the clustering can also be performed using, for example, vector quantization, in addition to an ADRC process.

As described above, when clustering is performed using a compression process, the number of classes can be decreased. However, on the contrary, when compared to performing clustering without performing a compression process, detailed clustering, so to speak, cannot be performed, and there are cases in which an appropriate process cannot be performed on image data.

That is, for example, image processing in which the clustering of image data is performed using vector quantization and image data is generated for each class is considered.

In this case, the image data is divided into blocks of a plurality of pixels, and a vector in which, for each block, a plurality of pixels (pixel values) forming the block are components (hereinafter referred to as a "block vector" where appropriate) is formed. Furthermore, the block vector is vector-quantized using a codebook which is determined in advance, and a code (symbol) as the vector quantization result is output as a class code representing the class of the block vector.

Then, image data is generated for each class code. That is, the class code is inversely quantized using the codebook, and the code vector corresponding to the class code is determined. Then, a block in which the components of the code vector are pixels is determined, and the block is arranged at the corresponding position, thereby generating image data.

Here, the inverse vector quantization can be performed using the same codebook as that used in the vector quantization, and also, for example, the inverse vector quantization can be performed using a codebook differing from that used in the vector quantization. That is, the inverse vector quantization can be performed using, for example, a codebook determined using image data having an image quality higher than that of the image data used to generate the codebook used in the vector quantization.

In this case, as a result of the class code being inversely vector quantized, the image data of the image quality corresponding to the image data used to generate the codebook used for the inverse vector quantization, that is, high-quality image data, is determined.

However, with respect to the high-quality image data obtained by inverse vector quantization, if image data for the object of vector quantization is assumed to be low-quality image data, in the above-described image processing, block vectors among the block vectors of the low-quality image data that are vector quantized into the same class code are all inversely vector quantized into the same class code, that is, the block vector of the same high-quality image data. In other words, the code vector determined in the inverse vector quantization has a so-called quantization error. Therefore, although the image data generated in the above-described image processing may be said to be of high quality, the image quality is deteriorated by an amount corresponding to the quantization error from the point of view of the image quality of the high-quality image data used for generating the codebook for the inverse vector quantization.

DISCLOSURE OF THE INVENTION

The present invention has been made in view of such circumstances, and aims to be able to obtain high-quality data by clustering.

The data conversion device of the present invention includes: class tap extraction means for extracting, from first data, a class tap used to cluster the first data; clustering means for clustering, on the basis of the class tap, the class tap into one of a plurality of classes; generation means for generating second data on the basis of the class of the class tap; correction level calculation means for detecting the features of the class tap on the basis of the class tap and the class thereof and for determining, based on the features, the correction level for correcting the second data generated by the generation means; and correction means for correcting the second data generated by the generation means by using the correction level determined by the correction level calculation means.

The data conversion method of the present invention includes: a class tap extraction step of extracting, from first data, a class tap used to cluster the first data; a clustering step of clustering, on the basis of the class tap, the class tap into one of a plurality of classes; a generation step of generating second data on the basis of the class of the class tap; a correction level calculation step of detecting the features of the class tap on the basis of the class tap and the class thereof and for determining, based on the features, the correction level for correcting the second data generated in the generation step; and a correction step of correcting the second data generated in the generation step by using the correction level determined in the correction level calculation step.

The first program of the present invention includes: a class tap extraction step of extracting, from first data, a class tap used to cluster the first data; a clustering step of clustering, on the basis of the class tap, the class tap into one of a plurality of classes; a generation step of generating second data on the basis of the class of the class tap; a correction level calculation step of detecting the features of the class tap on the basis of the class tap and the class thereof and for determining, based on the features, the correction level for correcting the second data generated in the generation step; and a correction step of correcting the second data generated in the generation step by using the correction level determined in the correction level calculation step.

The first recording medium of the present invention has recorded thereon a program including: a class tap extraction step of extracting, from first data, a class tap used to cluster the first data; a clustering step of clustering, on the basis of the class tap, the class tap into one of a plurality of classes; a generation step of generating second data on the basis of the class of the class tap; a correction level calculation step of detecting the features of the class tap on the basis of the class tap and the class thereof and for determining, based on the features, the correction level for correcting the second data generated in the generation step; and a correction step of correcting the second data generated in the generation step by using the correction level determined in the correction level calculation step.

The learning device of the present invention includes: learning-pair data generation means for generating, from learning data, learning-pair data, which is a combination of teacher data corresponding to the second data, which serves as a teacher for learning, and student data corresponding to the first data, which serves as a student for learning; clustering means for clustering the student data into one of a plurality of classes; first relationship computation means for determining a first relationship between the student data and first representative data with regard to the first data, the first representative data representing the class of the student data; second relationship computation means for determining a second relationship between teacher data corresponding to the student data and second representative data with regard to the second data, the second representative data representing the class of the student data; and learning means for learning correction information in which the first and second relationships correspond to each other.

The learning method of the present invention includes: a learning-pair data generation step of generating, from learning data, learning-pair data, which is a combination of teacher data corresponding to the second data, which serves as a teacher for learning, and student data corresponding to the first data, which serves as a student for learning; a clustering step of clustering the student data into one of a plurality of classes; a first relationship computation step of determining a first relationship between the student data and first representative data with regard to the first data, the first representative data representing the class of the student data; a second relationship computation step of determining a second relationship between teacher data corresponding to the student data and second representative data with regard to the second data, the second representative data representing the class of the student data; and a learning step of learning correction information in which the first and second relationships correspond to each other.

The second program of the present invention includes: a learning-pair data generation step of generating, from learning data, learning-pair data, which is a combination of teacher data corresponding to second data, which serves as a teacher for learning, and student data corresponding to first data, which serves as a student for learning; a clustering step of clustering the student data into one of a plurality of classes; a first relationship computation step of determining a first relationship between the student data and first representative data with regard to the first data, the first representative data representing the class of the student data; a second relationship computation step of determining a second relationship between teacher data corresponding to the student data and second representative data with regard to the second data, the second representative data representing the class of the student data; and a learning step of learning correction information in which the first and second relationships correspond to each other.

The second recording medium of the present invention has recorded thereon a program including: a learning-pair data generation step of generating, from learning data, learning-pair data, which is a combination of teacher data corresponding to second data, which serves as a teacher for learning, and student data corresponding to first data, which serves as a student for learning; a clustering step of clustering the student data into one of a plurality of classes; a first relationship computation step of determining a first relationship between the student data and first representative data with regard to the first data, the first representative data representing the class of the student data; a second relationship computation step of determining a second relationship between teacher data corresponding to the student data and second representative data with regard to the second data, the second representative data representing the class of the student data; and a learning step of learning correction information in which the first and second relationships correspond to each other.

In the data conversion device, the data conversion method, the first program, and the first recording medium of the present invention, a class tap used to cluster first data is extracted from the first data, and on the basis of the class tap, clustering for classifying the class tap into one of a plurality of classes is performed. Furthermore, on the basis of the class of the class tap, the second data is generated, the features of the class tap are detected based on the class tap and the class thereof, and based on the features, a correction level for correcting the second data is determined. Then, based on the correction level, the second data is corrected.

In the data conversion device, the data conversion method, the second program and, the second recording medium of the present invention, learning-pair data, which is a combination of teacher data corresponding to second data, which serves as a teacher for learning, and student data corresponding to first data, which serves as a student for learning, is generated from learning data, and clustering for classifying the student data into one of a plurality of classes is performed. Furthermore, a first relationship between the student data and first representative data with regard to the first data, the first representative data representing the class of the student data, is determined, and a second relationship between teacher data corresponding to the student data and second representative data with regard to the second data, the second representative data representing the class of the student data, is determined. Then, correction information in which the first and second relationships correspond to each other is learnt.

BRIEF DESCRIPTION OF THE DRAWINGS

FIG. 4 is a block diagram showing an example of the configuration of a clustering section 2 and a data generation section 3.

FIG. 5A shows an example of a codebook for clustering.

FIG. 5B shows an example of a data-generating codebook.

FIG. 7 is a flowchart illustrating processing in the codebook learning device.

FIG. 8A shows an example of learning pair data.

FIG. 8B shows an example of code-pair teacher information.

FIG. 11 is a block diagram showing a first example of the configuration of a correction level calculation section 4 and a data correction section 5.

FIG. 15 shows an example of an error table.

FIG. 20A shows a codebook for clustering.

FIG. 20B shows an SD angle table.

FIG. 21A illustrates processing in a feature extraction section 82, a correction angle estimation section 83, and a rotation section 91.

FIG. 21B illustrates processing in the feature extraction section 82, the correction angle estimation section 83, and the rotation section 91.

FIG. 21C illustrates processing in the feature extraction section 82, the correction angle estimation section 83, and the rotation section 91.

FIG. 21D illustrates processing in the feature extraction section 82, the correction angle estimation section 83, and the rotation section 91.

FIG. 26 shows an example of an error angle table.

FIG. 27 shows an example of a coefficient table.

FIG. 28 is a block diagram showing a fifth example of the configuration of a correction level calculation section 4 and a data correction section 5.

BEST MODE FOR CARRYING OUT THE INVENTION

Figure 1:
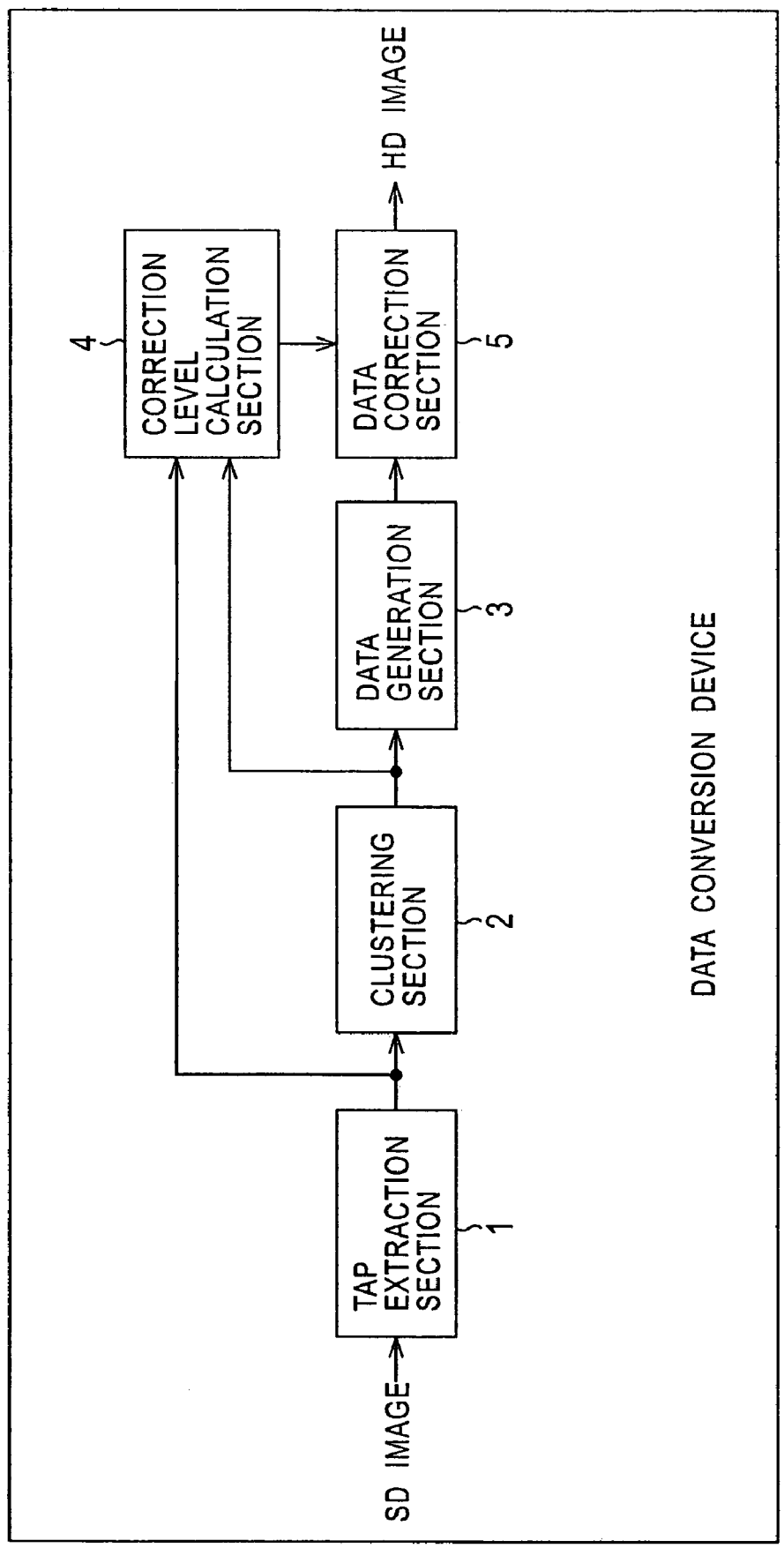
FIG. 1 is a block diagram showing an example of the configuration of an embodiment of a data conversion device to which the present invention is applied.

FIG. 1 shows an example of the configuration of an embodiment of a data conversion device to which the present invention is applied.

In this data conversion device, an image having a low resolution or an image having a standard resolution (hereinafter referred to as an "SD (Standard Definition)" image where appropriate) is converted into an image having a high resolution (hereinafter referred to as an "HD (High Definition)" image where appropriate).

More specifically, for example, 8-bit SD image data as digital data to be converted is supplied to a tap extraction section 1. Here, the SD image data may be a still image or a moving image.

The tap extraction section 1 extracts one or more pixels (pixel values) (sample values), which is a class tap, used to cluster the SD image data, from the pixels forming the SD image data (hereinafter referred to as "SD pixels" where appropriate) supplied thereto, and supplies the class tap to a clustering section 2 and a correction-level calculation section 4.

The clustering section 2 performs clustering for classifying the class tap into one of a plurality of classes on the basis of the class tap supplied from the tap extraction section 1, and supplies the class code indicating the class of the class tap to a data generation section 3 and the correction level calculation section 4.

Based on the class code supplied from the clustering section 2, the data generation section 3 generates, for example, (the pixel values of) one or more pixels forming an 8-bit HD image (hereinafter referred to as "HD pixels" where appropriate), which is the same number of bits as that of the SD image, and supplies them to a data correction section 5.

The correction level calculation section 4 detects the features of the class tap supplied from the tap extraction section 1 on the basis of the class tap supplied from the tap extraction section 1 and the class code supplied from the clustering section 2, determines, based on the features, the correction level for correcting the HD pixels generated in the data generation section 3, and supplies the correction level to the data correction section 5.

The data correction section 5 corrects the HD pixels supplied from the data generation section 3 in accordance with the correction level supplied from the correction level calculation section 4, forms HD image data formed of the corrected HD pixels, and outputs it.

Figure 2:
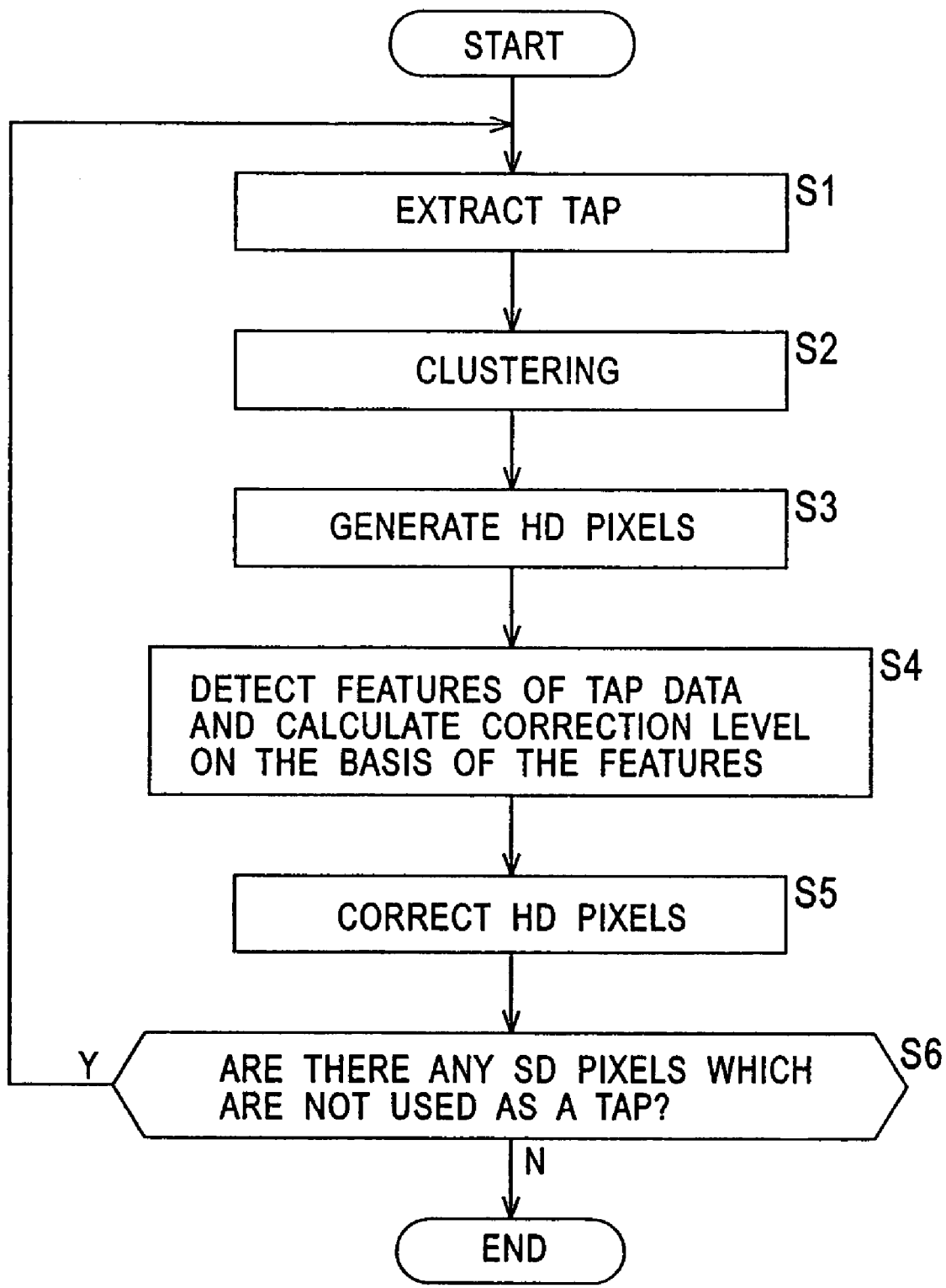
FIG. 2 is a flowchart illustrating processing in the data conversion device.

A description will now be given, with reference to the flowchart in FIG. 2, of processing in the data conversion device of FIG. 1.

Initially, in step S1, the tap extraction section 1 extracts one or more SD pixels as a class tap from the SD image data supplied to the tap extraction section 1, and supplies the SD pixels to the clustering section 2 and the correction level calculation section 4. Then, the process proceeds to step S2. In step S2, the clustering section 2 clusters the class tap from the tap extraction section 1, and supplies a class code indicating the class to the data generation section 3 and the correction level calculation section 4. Then, the process proceeds to step S3.

In step S3, the data generation section 3 generates (the pixel values of) one or more HD pixels on the basis of the class code of the class tap supplied from the clustering section 2, and supplies them to the data correction section 5. Then, the process proceeds to step S4.

In step S4, the correction level calculation section 4 detects the features of the class tap on the basis of class tap supplied from the tap extraction section 1 and the class code of the class tap, which is supplied from the clustering section 2, determines, based on the features, the correction level for correcting one or more HD pixels generated in the data generation section 3, and supplies the correction level to the data correction section 5.

Then, the process proceeds to step S5, where the data correction section 5 corrects one or more HD pixels supplied from the data generation section 3 in accordance with the correction level supplied from the correction level calculation section 4, and the process proceeds to step S6.

Here, after the data correction section 5 corrects one or more HD pixels supplied from the data generation section 3, the data correction section 5 holds the corrected HD pixels until, for example, the HD pixels for one frame (or one field) are stored. When the HD pixels for one frame are held, the HD image data for one frame is formed by the HD pixels, and this data is output.

In step S6, the tap extraction section 1 determines whether or not there are any SD pixels among the SD pixels forming the SD image data supplied thereto that are not extracted as a class tap.

When it is determined in step S6 that there are some SD pixels among the SD pixels forming the SD image data that are not extracted as a class tap, the process returns to step S1, where the tap extraction section 1 extracts, as a new class tap, from the SD image data supplied thereto, one or more SD pixels which are not extracted as a class tap; thereafter, similar processes are repeated.

When it is determined in step S6 that there are no SD pixels among the SD pixels forming the SD image data supplied to the tap extraction section 1 that are not extracted as a class tap, the processing is terminated.

Figure 3:
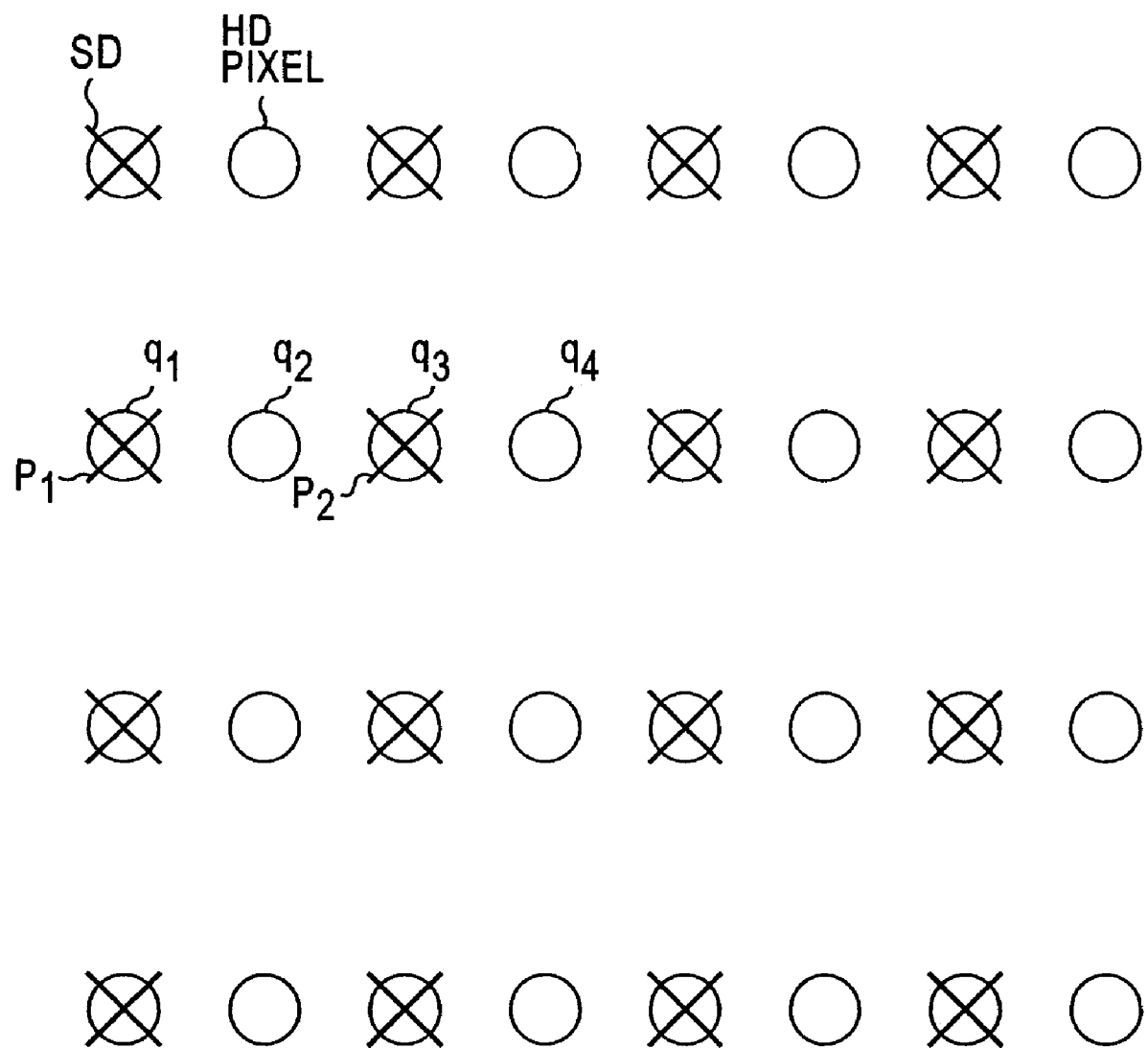
FIG. 3 shows the relationship between SD image data and HD image data.

Here, in this embodiment, it is assumed that, in the data conversion device, for example, as shown in FIG. 3, the SD image data (indicated by × marks in the figure) is converted into HD image data (indicated by ○ marks in the figure) whose number of horizontal pixels is twice that of the SD image data. Furthermore, in this embodiment, it is assumed that, in the tap extraction section 1, two SD pixels $p_1$ and $p_2$, which are adjacent in the horizontal direction, are extracted as a class tap from the SD pixels forming the SD image data, and that four HD pixels $q_1$, $q_2$, $q_3$, and $q_4$, which are adjacent in the horizontal direction, are generated with respect to the class tap in the data generation section 3. More specifically, it is assumed that, in the data generation section 3, the HD pixel $q_1$ at the same position of that of the SD pixel $p_1$, the HD pixel $q_2$ at the position between the SD pixels $p_1$ and $p_2$, the HD pixel $q_3$ at the same position as that of the SD pixel $p_2$, and the HD pixel $q_4$ at the position between the SD pixel $p_2$ and the SD pixel which is adjacent to the right thereof are generated.

The tap structure (the SD pixels forming the class tap) extracted (formed) in the tap extraction section 1 is not limited to the above-described tap structure. That is, in FIG. 3, although two adjacent SD pixel $q_1$ and $q_2$ are extracted as a class tap, the SD pixels used as a class tap are not limited to two pixels, and furthermore, they need not be adjacent.

The relationship between the class tap and one or more HD pixels generated from the class code of the class tap is not limited to the above-described one. That is, in FIG. 3, although four HD pixels $q_1$, $q_2$, $q_3$, and $q_4$, which are arranged in the horizontal direction, are generated from the class codes of the two SD pixels $p_1$ and $p_2$, the HD pixels to be generated are not limited to four pixels, and furthermore, the arrangement thereof need not be in the horizontal direction.

Next, FIG. 4 shows an example of the configuration of the clustering section 2 and the data generation section 3 of FIG. 1.

In the embodiment of FIG. 4, the clustering section 2 is formed of a vector quantization section 11 and a codebook storage section 12, and the data generation section 3 is formed of an inverse vector quantization section 21 and a codebook storage section 22.

In the clustering section 2, the codebook storage section 12 has stored therein a codebook used for vector quantization by the vector quantization section 11 (hereinafter referred to as a "clustering codebook" where appropriate). Based on the clustering codebook, the vector quantization section 11 performs clustering by performing vector quantization on the class tap supplied from the tap extraction section 1 (FIG. 1).

More specifically, for example, as shown in FIG. 5A, the codebook storage section 12 has stored therein, for each of a plurality of classes, a clustering codebook as assignment information such that a class code #C indicating a corresponding class is assigned to a code vector (hereinafter referred to as an "SD code vector" where appropriate) $(P_1, P_2)$ for the SD image data, which represents each class.

Then, the vector quantization section 11 assumes a class tap formed of two pixels $p_1$ and $p_2$, which are supplied from the tap extraction section 1, to be a vector $(p_1, p_2)$ in which the two pixels $p_1$ and $p_2$ are components (hereinafter referred to as a "tap vector" where appropriate), and performs vector quantization thereon by using the clustering codebook.

More specifically, the vector quantization section 11 determines the distance between the tap vector $(p_1, p_2)$ and the SD code vector $(P_1, P_2)$ of each class, searches the clustering codebook for the class code #C assigned to the SD code vector $(P_1, P_2)$ at which the distance is minimized, and outputs it as the clustered result.

Here, in this embodiment, since the tap vector $(p_1, p_2)$ on which vector quantization is to be performed by the vector quantization section 11 is a two-dimensional vector, the SD code vector $(P_1, P_2)$ of the clustering codebook shown in FIG. 5A is also a two-dimensional vector.

The class code output by the vector quantization section 11 is supplied to the data generation section 3 and the correction level calculation section 4.

In the data generation section 3, the codebook storage section 22 has stored therein a codebook used for inverse vector quantization by the inverse vector quantization section 21 (hereinafter referred to as a "data-generating codebook" where appropriate). Based on the data-generating codebook, the inverse vector quantization section 21 generates HD pixels by performing inverse vector quantization on the class code supplied from the vector quantization section 11.

More specifically, for example, as shown in FIG. 5B, the codebook storage section 22 has stored therein, for each class which is the same as that registered in the clustering codebook of FIG. 5A, a data-generating codebook as assignment information such that the class code #C indicating the corresponding class is assigned to the code vector for the HD image data (hereinafter referred to as a "HD code vector" where appropriate) $(Q_1, Q_2, Q_3, Q_4)$, which represents each class.

Then, the inverse vector quantization section 21 searches the data generation codebook for the class code #C supplied from the vector quantization section 11, and outputs to the data correction section 5 (FIG. 1), as the HD pixels, the components $Q_1, Q_2, Q_3$, and $Q_4$ of the HD code vector $(Q_1, Q_2, Q_3, Q_4)$ assigned to the class code #C.

Here, in this embodiment, as described with reference to FIG. 3, in the data generation section 3, since four HD pixels $q_1, q_2, q_3$, and $q_4$, which are adjacent horizontally, are generated, the HD code vector $(Q_1, Q_2, Q_3, Q_4)$ of the data-generating codebook shown in FIG. 5B is a four-dimensional vector formed of four components $Q_1, Q_2, Q_3$, and $Q_4$ corresponding to the four HD pixels $q_1, q_2, q_3$, and $q_4$, respectively.

Next, the clustering codebook of FIG. 5A and the data-generating codebook of FIG. 5B are determined in advance by learning.

Figure 6:
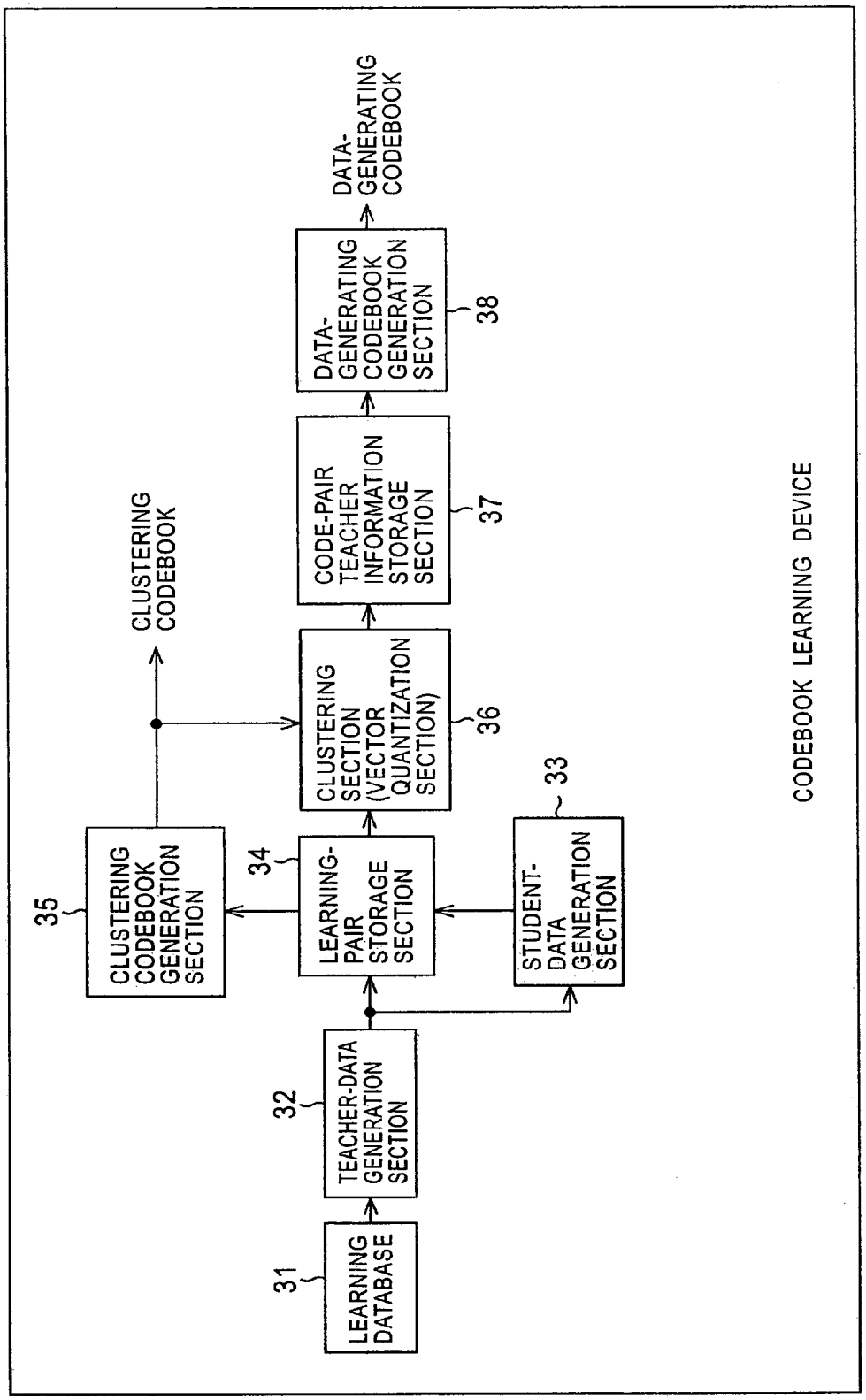
FIG. 6 is a block diagram showing an example of the configuration of a codebook learning device that determines a codebook.

Accordingly, FIG. 6 shows an example of the configuration of a codebook learning device that determines a clustering codebook and a data-generating codebook (hereinafter, both will be referred to simply as a "codebook" where appropriate).

In a learning database 31, image data for learning, provided in advance for learning the codebook, is stored. Here, as the image data for learning, for example, HD image data may be employed.

A teacher-data generation section 32 generates teacher data, which serves as a teacher for learning a codebook, from the learning image data stored in the learning database 31. That is, the teacher-data generation section 32 divides the HD pixels forming the learning image data into units of four pixels, which is the same arrangement as that of the four HD pixels generated in the data generation section 3 of FIG. 1, and supplies the HD pixels in units of four pixels, as teacher data, to a student-data generation section 33 and a learning-pair storage section 34.

The student-data generation section 33 generates student data, which serves as a student for learning a codebook, from the teacher data supplied from the teacher-data generation section 32. That is, the student-data generation section 33 reduces, for example, the four HD pixels as the teacher data supplied from the teacher-data generation section 32 to two pixels, and further performs filtering using an LPF (Low Pass Filter), thereby forming SD pixels in units of two pixels. That is, the student-data generation section 33 decimates the second HD pixel $q_2$ and the fourth HD pixel $q_4$ among the HD pixels $q_1, q_2, q_3$, and $q_4$ in units of four pixels, shown in FIG. 3, and filters the remaining two HD pixels $q_1$ and $q_3$ by using an LPF, forming two SD pixels $p_1$ and $p_2$ in units of two pixels, shown in FIG. 3. Then, the student-data generation section 33 supplies the SD pixels in units of two pixels, as student data, to the learning-pair storage section 34.

Here, in the above-described case, although, in order to facilitate the understanding of the corresponding relationship between the student data and the teacher data, student data, which are SD pixels in units of two pixels, are generated from the teacher data, which are HD pixels in units of four pixels, in the student-data generation section 33, the HD image data as the learning image data stored in the learning database 31 may be decimated in units of, for example, one frame and filtered using an LPF, the resulting SD image data of one frame may be divided into units of two pixels, which is the same arrangement as that of the two SD pixels extracted as a class tap by the tap extraction section 1 of FIG. 1, and the SD pixels in units of two pixels may be extracted as the student data.

The learning-pair storage section 34 stores, as learning pair data which is a pair for learning a codebook, the combination of the teacher data as the HD pixels in units of four pixels, which are supplied from the teacher-data generation section 32, and the student data as the SD pixels in units of two pixels, generated from the teacher data, which are supplied from the student-data generation section 33.

A clustering codebook generation section 35 reads learning pair data in sequence from the learning-pair storage section 34, determines (generates) a clustering codebook by using the student data among the learning pair data, and supplies the clustering codebook to a clustering section 36. The clustering codebook determined in the clustering codebook generation section 35 is stored in the codebook storage section 12 of FIG. 4.

The clustering section 36, which is configured similarly to the clustering section 2 shown in FIG. 4, sequentially reads the learning pair data stored in the learning-pair storage section 34, and clusters the student data. Furthermore, the clustering section 36 supplies the class code obtained as a result of the clustering, together with the corresponding learning pair data, to a code-pair teacher information storage section 37.

The code-pair teacher information storage section 37 extracts the teacher data from the learning pair data supplied from the clustering section 36, generates code-pair teacher information in which the teacher data and the class code supplied, together with the learning pair data, from the clustering section 36 correspond to each other, and stores the code-pair teacher information. Therefore, the code-pair teacher data information is such that the class code indicating the class of the student data and the teacher data corresponding to the student data are made to correspond to each other.

A data-generating codebook generation section 38 sequentially reads code-pair teacher information from the code-pair teacher information storage section 37, and determines (generates) a data-generating codebook by using the code-pair teacher information. The data-generating codebook, which is determined in the data-generating codebook generation section 38, is stored in the codebook storage section 22 of FIG. 4.

A description will now be given, with reference to the flowchart in FIG. 7, of processing in the codebook learning device of FIG. 6.

Initially, in step S11, the teacher-data generation section 32 generates teacher data from the learning image data stored in the learning database 31, and supplies the teacher data to the student-data generation section 33 and the learning-pair storage section 34. Furthermore, in step S11, the student-data generation section 33 generates student data from the teacher data supplied from the teacher-data generation section 32, and supplies the student data to the learning-pair storage section 34. Furthermore, in step S11, the learning-pair storage section 34 generates learning pair data by combining the teacher data supplied from the teacher-data generation section 32 and the student data corresponding to the teacher data, which is supplied from the student-data generation section 33, and stores the learning pair data.

Here, FIG. 8A shows learning pair data stored by the learning-pair storage section 34. In the learning-pair storage section 34, as shown in FIG. 8A, the learning pair data, which is a combination of the teacher data as HD pixels ($q_1, q_2, q_3, q_4$) in units of four pixels and the student data as SD pixels ($p_1, p_2$) in units of two pixels, which corresponds to the teacher data, is stored. In FIG. 8A, N sets of learning pair data are stored. In FIG. 8A, the variable i within the parenthesis ( ) in the teacher data ($q_1(i), q_2(i), q_3(i), q_4(i)$) and the student data ($p_1(i), p_2(i)$) indicates that the data is the i-th data.

In step S11, when the learning pair data is generated with regard to all the learning data stored in the learning database 31 and the learning pair data is stored in the learning-pair storage section 34, the process proceeds to step S12, where the clustering codebook generation section 35 determines the clustering codebook by using the student data in the learning pair data stored in the learning-pair storage section 34.

More specifically, by using the vector in which two SD pixels as the student data in the learning pair data are components, the clustering codebook generation section 35 generates, in accordance with, for example, the LBG (Linde Buzo Gray) algorithm, the clustering codebook shown in FIG. 5A, in which the class code #C indicating the class and the SD code vector ($P_1, P_2$) representing the class are made to correspond to each other, and supplies the clustering codebook to the clustering section 36.

Thereafter, the process proceeds to step S13, where the clustering section 36 sequentially reads the learning pair data stored in the learning-pair storage section 34, and clusters the student data. Furthermore, the clustering section 36 supplies the class code obtained as a result of the clustering, together with the corresponding learning pair data, to the code-pair teacher information storage section 37. The code-pair teacher information storage section 37 extracts the teacher data from the learning pair data supplied from the clustering section 36, and generates code-pair teacher information in which the teacher data and the class code supplied from the clustering section 36 together with the learning pair data are made to correspond to each other, and stores the code-pair teacher information.

Here, FIG. 8B shows code-pair teacher information generated by the code-pair teacher information storage section 37. In the code-pair teacher information, as shown in FIG. 8B, the class code #C indicating the class of the student data and the teacher data ($q_1, q_2, q_3, q_4$) as the HD pixels in units of four pixels, which corresponds to the student data, are made to correspond to each other. The code-pair teacher information of FIG. 8B corresponds to the learning pair data of FIG. 8A. That is, in FIG. 8B, the teacher data ($q_1(i), q_2(i), q_3(i), q_4(i)$) are the same as that shown in FIG. 8A, and the class code #$C_i$ corresponding to the i-th teacher data ($q_1(i), q_2(i), q_3(i), q_4(i)$) is the class code of the i-th student data ($p_1(i), p_2(i)$).

When the code-pair teacher information is obtained for all the learning pair data in step S13, the process proceeds to step S14, where the data-generating codebook generation section 38 determines the data-generating codebook by using the code-pair teacher information stored in the code-pair teacher information storage section 37, and the processing is terminated.

More specifically, the data-generating codebook generation section 38 determines, for example, the teacher data of the same class code #C from the code-pair teacher information, and further determines the center of gravity of the teacher data. More specifically, for example, by assuming that M pieces of teacher data of the same class code #C exist, when the m-th teacher data is represented as ($q_1(m)$ (c), $q_2(m)$ (c), $q_3(m)$ (c), $q_4(m)$ (c)), the data-generating codebook generation section 38 determines the center of gravity of the teacher data of the class code #C, which is represented by ($\Sigma q_1(m)$ (c)/M, $\Sigma q_2(m)$ (c)/M, $\Sigma q_3(m)$ (c)/M, $\Sigma q_4(m)$(c)/M). Here, $\Sigma$ indicates the summation in which m is varied from 1 to M.

Then, the data-generating codebook generation section 38 causes the center of gravity of the teacher data of the class code #C, as the code vector (HD code vector) ($Q_1, Q_2, Q_3, Q_4$) with regard to the HD image data, which represents the class indicated by the class code #C, to correspond to the class code #C. With regard to the class codes of the other values, in a similar manner, the data-generating codebook generation section 38 determines the HD code vector, and generates, for each class, a data-generating codebook, shown in FIG. 5B, in which the class code and the HD code vector are made to correspond to each other.

In the above-described case, although, in the clustering codebook generation section 35, a clustering codebook is generated in accordance with the LBG algorithm, which is one of techniques used to generate a codebook used for vector quantization, the clustering codebook may be generated by a technique other than the technique used to generate a codebook used for vector quantization. That is, the clustering codebook can be generated as shown in, for example, FIG. 9.

Figure 9:
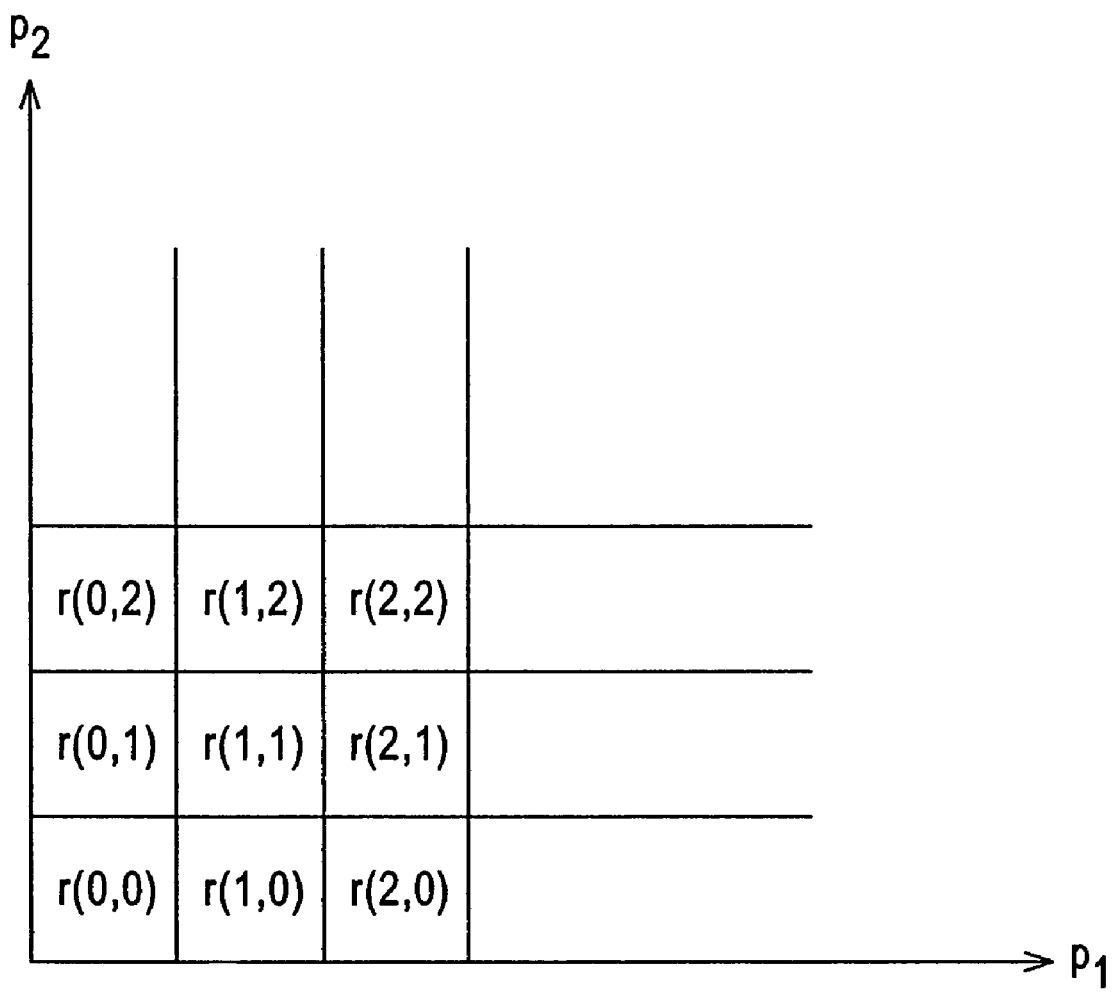
FIG. 9 illustrates a method for generating a clustering codebook.

Here, in FIG. 9, a rectangular region r(i, j) is formed as a result of a two-dimensional space (hereinafter referred to as an "SD image space" where appropriate), which represents two SD pixels $p_1$ and $p_2$ as student data, being divided in a grid manner. In FIG. 9, the pixel values of the SD pixels $p_1$ and $p_2$ are plotted in the horizontal axis and in the vertical axis, respectively. In this embodiment, since the SD image data is 8-bit image data in the manner described above, the values that the horizontal axis and the vertical axis can take in the SD image space is, for example, 0 to 255 (=$2^8$−1). In FIG. 9, r(i, j) indicates a region which is the i-th from the left and the j-th from the bottom in the SD image space, and a unique class code #C indicating the class is assigned to each region r(i, j).

The clustering codebook generation section 35 determines the student data represented as points within the region r(i, j) with regard to each region r(i, j), and, for example, further determines the center of gravity of the student data. That is, the number of sets of the two SD pixels $p_1$ and $p_2$ as the student data represented as the points within the region r(i, j) is K, and when the k-th student data is represented as $(p_{1,r(i,j)}(k), p_{2,r(i,j)}(k))$ the clustering codebook-generation section 35 determines the center of gravity of the student data of the class code #C assigned to the region r(i, j), which is represented as $(\Sigma p_{1,r(i,j)}(k)/K, \Sigma p_{2,r(i,j)}(k)/K)$. Here, $\Sigma$ indicates the summation in which k is varied from 1 to K.

Then, the clustering codebook generation section 35 causes the center of gravity of the student data of the class code #C, as the code vector (SD code vector) $(P_1, P_2)$ with regard to the SD image data, to correspond to the class code #C. In a similar manner, also, with regard to the region r(i, j) to which the class code of another value is assigned, the clustering codebook generation section 35 determines the SD code vector, and generates a clustering codebook, shown in FIG. 5A, in which the class code and the SD code vector are made to correspond to each other.

When a four-dimensional space representing four HD pixels $q_1, q_2, q_3$, and $q_4$ as the teacher data is assumed to be an HD image space, the teacher data can be represented as a vector representing points in that HD image space. Furthermore, the student data can also be represented as a vector representing points in the above-described SD image space. Furthermore, since the class tap formed of the SD pixels $p_1$ and $p_2$ in units of two pixels, obtained by the tap extraction section 1, that is, the tap vector $(p_1, p_2)$ corresponds to the student data, the tap vector $(p_1, p_2)$ is also represented as a vector representing points in the SD image space in a manner similar to the student data.

Figure 10A:
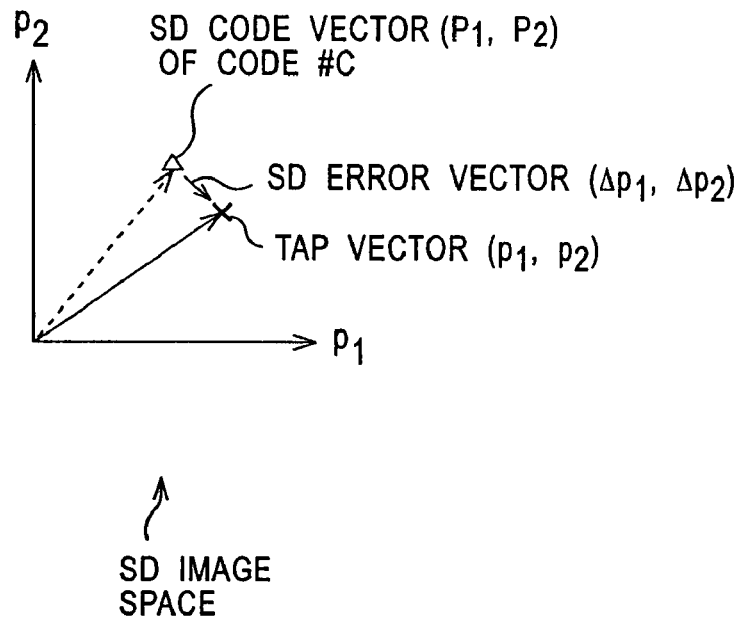
FIG. 10A shows an example of an SD image space.
Figure 10B:
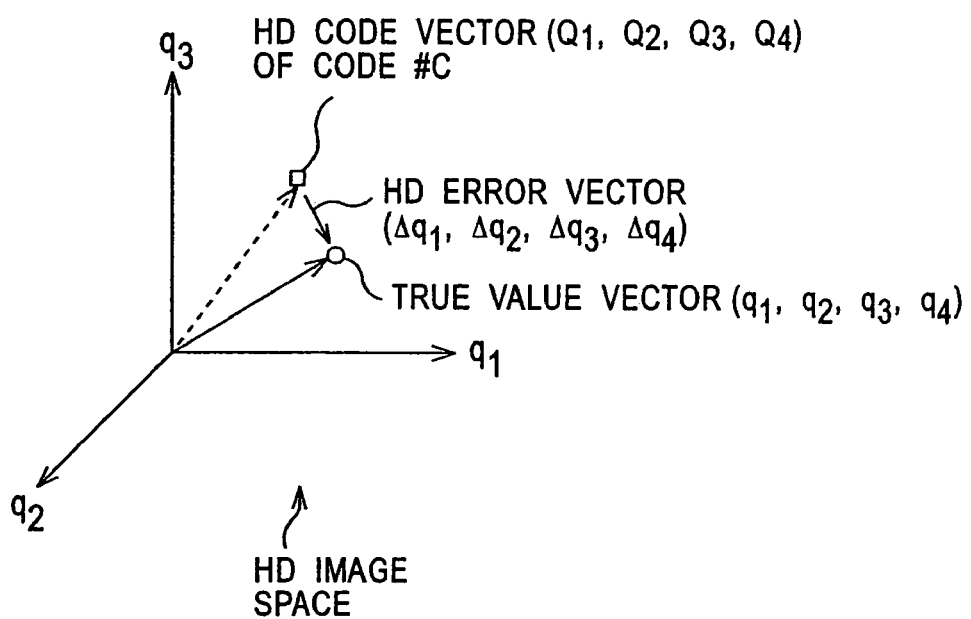
FIG. 10B shows an example of an HD image space.

In the vector quantization section 11 of FIG. 4, as shown in FIG. 10A, in the SD image space, an SD code vector $(P_1, P_2)$ that minimizes the distance to the tap vector $(p_1, p_2)$ is detected, and the class code #C of the SD code vector $(P_1, P_2)$ is output. Then, in the inverse vector quantization section 21 of FIG. 4, as shown in FIG. 10B, the HD code vector $(Q_1, Q_2, Q_3, Q_4)$ of the class code #C in the HD image space is determined, and the components $Q_1, Q_2, Q_3$, and $Q_4$ thereof are output as the four HD pixels.

Here, in FIG. 10 (the same applies to FIG. 16 (to be described later)), since it is difficult to illustrate a four-dimensional space, a three-dimensional space in which the three HD pixels $q_1, q_2$, and $q_3$ are each an axis is shown as an HD image space.

In most cases, the SD code vector $(P_1, P_2)$ in the SD image space does not match the tap vector $(p_1, p_2)$ which is clustered into the class code #C (in this embodiment, vector quantization). This is because the SD code vector $(P_1, P_2)$ is a vector which represents a plurality of points (vector) in the SD image space belonging to the class of the class code #C.

When it is assumed that the true values $q_1, q_2, q_3$, and $q_4$ of the four HD pixels corresponding to the two SD pixels $p_1$ and $p_2$ exist with respect to the two SD pixels $p_1$ and $p_2$, which are components of a certain tap vector $(p_1, p_2)$ in the SD image space, that is, when it is assumed that a vector in which the two SD pixels $p_1$ and $p_2$ obtained by processing the true values $q_1, q_2, q_3$, and $q_4$ of the four HD pixels by the student-data generation section 33 of FIG. 6 is a tap vector, in most cases, the HD code vector $(Q_1, Q_2, Q_3, Q_4)$ in the HD image space, of the class code #C indicating the class of the tap vector $(p_1, p_2)$, also does not match the vector in which the true values $q_1, q_2, q_3$, and $q_4$ of the four HD pixels corresponding to the tap vector $(p_1, p_2)$ are components (hereinafter referred to as a "true value vector" where appropriate) $(q_1, q_2, q_3, q_4)$. This is also because the HD code vector $(Q_1, Q_2, Q_3, Q_4)$ is a vector which represents a plurality of points (vector) in the HD image space, which belongs to the class of the class code #C.

Based on the above, the HD image data formed of HD pixels output by the inverse vector quantization section 21 (FIG. 4) of the data generation section 3 generally does not match the true values, and as a result, the HD image data becomes deteriorated in its image quality.

More specifically, in FIG. 4, for all the class taps clustered into the class code #C in the vector quantization section 11, the HD code vector of the class code #C is output in the inverse vector quantization section 21. That is, in the clustering section 2 and the data generation section 3 of FIG. 4, all the combinations of the two SD pixels $p_1$ and $p_2$ belonging to the class of the class code #C are converted into the four HD pixels $Q_1, Q_2, Q_3$, and $Q_4$, which are components of the HD code vector, which represents the class of the class code #C, and the HD image data formed by such HD pixels becomes deteriorated in its image quality with respect to the HD image data of the true values.

Accordingly, in the data conversion device of FIG. 1, the data correction section 5 corrects the HD pixels output by the data generation section 3 into HD pixels which are closer to the true values.

More specifically, in FIG. 10B, if a vector $(\Delta q_1, \Delta q_2, \Delta q_3, \Delta q_4)$ $(=(q_1-Q_1, q_2-Q_2, q_3-Q_3, q_4-Q_4))$ in which the HD code vector $(Q_1, Q_2, Q_3, Q_4)$ of the class code #C is subtracted from the true value vector $(q_1, q_2, q_3, q_4)$ in which the true values $q_1, q_2, q_3$, and $q_4$ of the four HD pixels corresponding to the tap vector $(p_1, p_2)$ clustered into the class of the class code #C are components is assumed to be an HD error vector, this HD error vector $(\Delta q_1, \Delta q_2, \Delta q_3, \Delta q_4)$ indicates the error, with respect to the true value vector $(q_1, q_2, q_3, q_4)$, of the HD code vector $(Q_1, Q_2, Q_3, Q_4)$ of the class code #C (hereinafter referred to as an "HD error" where appropriate). Therefore, if the HD code vector $(Q_1, Q_2, Q_3, Q_4)$ of the class code #C is corrected by a correction level corresponding to the HD error vector $(\Delta q_1, \Delta q_2, \Delta q_3, \Delta q_4)$ the true value vector $(q_1, q_2, q_3, q_4)$ can be obtained.

In this case, if the true value vector $(q_1, q_2, q_3, q_4)$ exists, since the HD error vector $(\Delta q_1, \Delta q_2, \Delta q_3, \Delta q_4)$ can be determined, the HD code vector $(Q_1, Q_2, Q_3, Q_4)$ of the class code #C can easily be corrected into the true value vector $(q_1, q_2, q_3, q_4)$ by using the error vector $(\Delta q_1, \Delta q_2, \Delta q_3, \Delta q_4)$. However, when processing is performed in the data conversion device of FIG. 1, since the true value vector $(q_1, q_2, q_3, q_4)$ does not exist, how the correction level corresponding to the HD error vector $(\Delta q_1, \Delta q_2, \Delta q_3, \Delta q_4)$ is estimated with accuracy becomes a problem.

In the clustering section 2, the tap vector $(p_1, p_2)$ is clustered, and this is made to be a class code #C indicating the class. If a vector $(\Delta p_1, \Delta p_2)$ $(=(p_1-P_1, p_2-P_2))$ in which the SD code vector $(P_1, P_2)$ of the class of the class code #C is subtracted from the tap vector $(p_1, p_2)$ is assumed to be an SD error vector, this SD error vector $(\Delta p_1, \Delta p_2)$ indicates the error with respect to the tap vector $(p_1, p_2)$, of the SD code vector $(P_1, P_2)$ of the class of the class code #C (hereinafter referred to as an "SD error" where appropriate).

On the other hand, the tap vector $(p_1, p_2)$ and the true value vector $(q_1, q_2, q_3, q_4)$ have a large correlation because the tap vector $(p_1, p_2)$ is obtained by processing the true value vector $(q_1, q_2, q_3, q_4)$ by the student-data generation section 33 of FIG. 6. Furthermore, the SD code vector $(P_1, P_2)$ of the class code #C and the HD code vector $(Q_1, Q_2, Q_3, Q_4)$ also have a large correlation because the SD code vector $(P_1, P_2)$ is the center of gravity of the student data belonging to the class of the class code #C and the HD code vector $(Q_1, Q_2, Q_3, Q_4)$ is the center of gravity of the teacher data corresponding to the student data belonging to the class of the class code #C.

Therefore, the SD error vector $(\Delta p_1, \Delta p_2)$, which is determined from the tap vector $(p_1, p_2)$ and the SD code vector $(P_1, P_2)$, and the HD error vector $(\Delta q_1, \Delta q_2, \Delta q_3, \Delta q_4)$, which is determined from the true value vector $(q_1, q_2, q_3, q_4)$ and the HD code vector $(Q_1, Q_2, Q_3, Q_4)$ have a large correlation.

As a result of the above, the correction level corresponding to the HD error vector $(\Delta q_1, \Delta q_2, \Delta q_3, \Delta q_4)$ can be estimated with accuracy on the basis of the SD error vector $(\Delta p_1, \Delta p_2)$ having a large correlation with the HD error vector $(\Delta q_1, \Delta q_2, \Delta q_3, \Delta q_4)$.

Here, the SD error vector $(\Delta p_1, \Delta p_2)$ can be determined from the tap vector $(p_1, p_2)$ generated from the SD image data supplied from the tap extraction section 1, and the SD code vector $(P_1, P_2)$ which is uniquely specified from the class of the tap vector $(p_1, p_2)$. Therefore, it may be said that the SD error vector $(\Delta p_1, \Delta p_2)$ represents the features of the tap vector $(p_1, p_2)$. In this case, it may be said that the correction level can be estimated with accuracy from the features of the tap vector $(p_1, p_2)$.

FIG. 11 shows a first example of the configuration of the correction level calculation section 4 and the data correction section 5 of FIG. 1, for estimating the correction level on the basis of the features of the tap vector $(p_1, p_2)$ and for correcting the HD code vector $(Q_1, Q_2, Q_3, Q_4)$ on the basis of the correction level in the above-described manner.

In the embodiment of FIG. 11, the correction level calculation section 4 is formed of a clustering codebook storage section 41, a feature extraction section 42, and an HD error estimation section 43; and the data correction section 5 is formed of an addition section 51.

In the correction level calculation section 4, the clustering codebook storage section 41 has stored therein the same clustering codebook (FIG. 5A) as that of the codebook storage section 12 in the clustering section 2 of FIG. 4, and the class code #C of the tap vector $(p_1, p_2)$ output by the clustering section 2 is supplied to the clustering codebook. The clustering codebook storage section 41 supplies the SD code vector $(P_1, P_2)$ which corresponds to the class code #C supplied from the clustering section 2, that is, the SD code vector $(P_1, P_2)$ of the class indicated by the class code #C, to the feature extraction section 42.

The SD code vector $(P_1, P_2)$ of the class of the tap vector is supplied to the feature extraction section 42 from the clustering codebook storage section 41, and also, the tap vector $(p_1, p_2)$ output by the tap extraction section 1 is supplied to the feature extraction section 42. The feature extraction section 42 determines an SD error vector $(\Delta p_1, \Delta p_2)$ $(=(p_1-P_1, p_2-P_2))$ by subtracting an SD code vector $(P_1, P_2)$ of the class of the tap vector $(p_1, p_2)$ from the tap vector $(p_1, p_2)$, and supplies the SD error vector $(\Delta p_1, \Delta p_2)$, as the features of the tap vector $(p_1, p_2)$, to the HD error estimation section 43.

Based on the SD error vector $(\Delta p_1, \Delta p_2)$ as the features of the tap vector $(p_1, p_2)$, which is supplied from the feature extraction section 42, the HD error estimation section 43 estimates an HD error vector $(\Delta q_1, \Delta q_2, \Delta q_3, \Delta q_4)$ in which the HD code vector $(Q_1, Q_2, Q_3, Q_4)$ of the class of the tap vector $(p_1, p_2)$ is subtracted from the true value vector $(q_1, q_2, q_3, q_4)$.

More specifically, in this embodiment, as shown in FIG. 3, in the data generation section 3 (FIG. 1), the HD pixel $q_1$ at the same position as that of the SD pixel $p_1$, the HD pixel $q_2$ at the position between the SD pixels $p_1$ and $p_2$, the HD pixel $q_3$ at the same position of that of the SD pixel $p_2$, and the HD pixel $q_4$ at the position between the SD pixel $p_2$ and the SD pixel which is adjacent to the right thereof are generated.

Therefore, the HD error estimation section 43 assumes the HD error $\Delta q_1$ for the HD pixel $q_1$ to be of the same degree as for the SD error $\Delta p_1$ for the SD pixel $p_1$ at the same position as that of the HD pixel $q_1$. Furthermore, the HD error estimation section 43 also assumes the HD error $\Delta q_3$ for the HD pixel $q_3$ to be of the same degree as for the SD error $\Delta p_2$ for the SD pixel $p_2$ at the same position as that of the HD pixel $q_3$. That is, the HD error estimation section 43 assumes the HD error $\Delta q_1$ to be the same value as the SD error $\Delta p_1$ and assumes the HD error $\Delta q_3$ to be the same value as for the SD error $\Delta p_2$.

Regarding the HD pixels $q_2$ and $q_4$, in the SD image data, SD pixels at the same position do not exist. For this reason, how the HD errors $\Delta q_2$ and $\Delta q_4$ are estimated becomes a problem. The HD pixels $q_2$ and $q_4$ are not pixels at the same positions as those of the SD pixels $p_1$ and $p_2$, which are the components of the tap vector $(p_1, p_2)$, but pixels at the positions closer thereto (in this embodiment, the adjacent positions). Consequently, the HD errors $\Delta q_2$ and $\Delta q_4$ have a tendency similar to the SD error $\Delta p_1$ for the SD pixel $p_1$ and the SD error $\Delta p_2$ for the SD pixel $p_2$.

Therefore, the HD error estimation section 43 computes, for example, the arithmetic mean value $(\Delta p_1+\Delta p_2)/2$ of the SD errors $\Delta p_1$ and $\Delta p_2$ or the geometric mean value $\sqrt{(\Delta p_1 \times \Delta p_2)}$ thereof, and assumes the arithmetic mean value or the geometric mean value as the HD error $\Delta q_2$ or $\Delta q_4$.

The HD error estimation section 43 estimates the HD errors $\Delta q_1, \Delta q_2, \Delta q_3,$ and $\Delta q_4$ in the above-described manner, and supplies the HD error vector $(\Delta q_1, \Delta q_2, \Delta q_3, \Delta q_4)$, in which those errors are components, as the correction level, to the data correction section 5.

In the data correction section 5, the HD code vector $(Q_1, Q_2, Q_3, Q_4)$ of the class code #C of the tap vector $(p_1, p_2)$ supplied from the inverse vector quantization section 21 in the data generation section 3 of FIG. 4 is corrected by adding the HD error vector $(\Delta q_1, \Delta q_2, \Delta q_3, \Delta q_4)$ as the correction level from the HD error estimation section 43 to the HD code vector $(Q_1, Q_2, Q_3, Q_4)$ in the addition section 51.

When the corrected HD code vector is assumed to be an HD correction vector $(q_1', q_2', q_3', q_4')$, in the embodiment of FIG. 11, as the HD correction vector $(q_1', q_2', q_3', q_4')$, $(Q_1+\Delta q_1, Q_2+\Delta q_2, Q_3+\Delta q_3, Q_4+\Delta q_4)$ is obtained.

Figure 12:
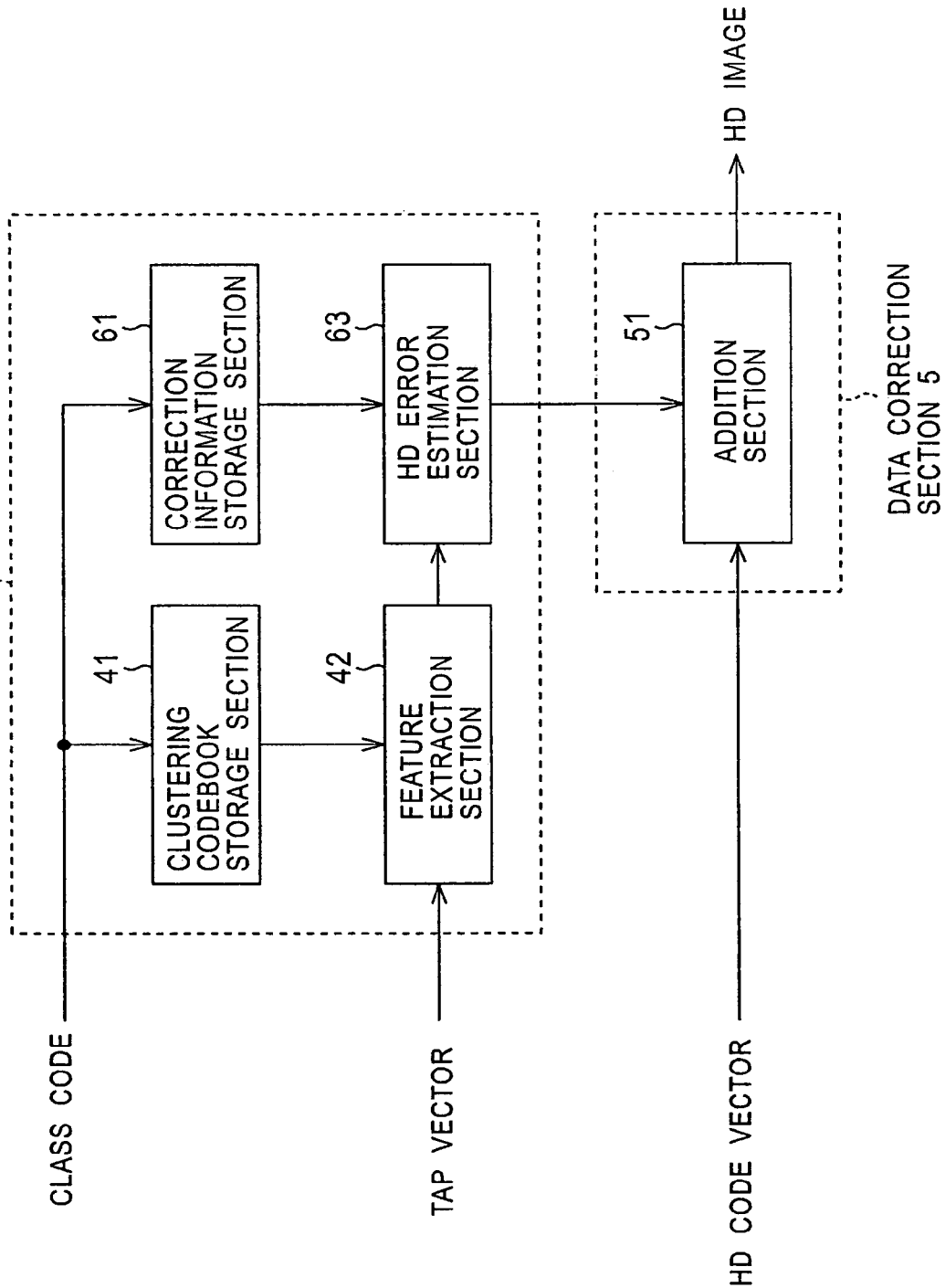
FIG. 12 is a block diagram showing a second example of the configuration of a correction level calculation section 4 and a data correction section 5.

Next, FIG. 12 shows a second example of the configuration of the correction level calculation section 4 and the data correction section 5 of FIG. 1. Components in FIG. 12, which correspond to those in FIG. 11, are designated with the same reference numerals, and descriptions thereof are omitted where appropriate. That is, in FIG. 12, the correction level calculation section 4 is configured in the same way as in the case of FIG. 11 except that a correction information storage section 61 is newly provided and an HD error estimation section 63 is newly provided in place of the HD error estimation section 43. In FIG. 12, the data correction section 5 is configured in the same way as in the case of FIG. 11.

Therefore, also, in the embodiment of FIG. 12, similarly to the case in FIG. 11, in the clustering codebook storage section 41 and the feature extraction section 42, the SD error vector $(\Delta p_1, \Delta p_2)$ is determined as the features of the tap vector $(p_1, p_2)$, and is supplied to the HD error estimation section 63.

On the other hand, the correction information storage section 61 has stored therein correction information for correcting the correction level for correcting the HD code vector $(Q_1, Q_2, Q_3, Q_4)$ in the data correction section 5. Here, this correction information is determined for each class, for example, by learning, and the learning method will be described later.

The class code #C of the tap vector ($p_1$, $p_2$) is supplied to the correction information storage section 61 from the clustering section 2 (FIG. 4). The correction information storage section 61 reads the correction information of the class indicated by the class code #C of the tap vector ($p_1$, $p_2$) from among the correction information for each class, which is stored therein, and supplies the correction information to the HD error estimation section 63.

The HD error estimation section 63 estimates the HD error vector ($\Delta q_1$, $\Delta q_2$, $\Delta q_3$, $\Delta q_4$) as the correction level on the basis of the correction information of the class of the tap vector ($p_1$, $p_2$), which is supplied from the correction information storage section 61, and the SD error vector ($\Delta p_1$, $\Delta p_2$) as the features of the tap vector ($p_1$, $p_2$), which is supplied from the feature extraction section 42, and supplies the HD error vector to the data correction section 5.

Thereafter, in the data correction section 5, similarly to the case in FIG. 11, the HD code vector ($Q_1$, $Q_2$, $Q_3$, $Q_4$) of the class code #C of the tap vector ($p_1$, $p_2$) is corrected by the HD error vector ($\Delta q_1$, $\Delta q_2$, $\Delta q_3$, $\Delta q_4$) as the correction level from the HD error estimation section 43, and the HD code vector ($Q_1$, $Q_2$, $Q_3$, $Q_4$) is made to be an HD correction vector ($q_1'$, $q_2'$, $q_3'$, $q_4'$).

Figure 13:
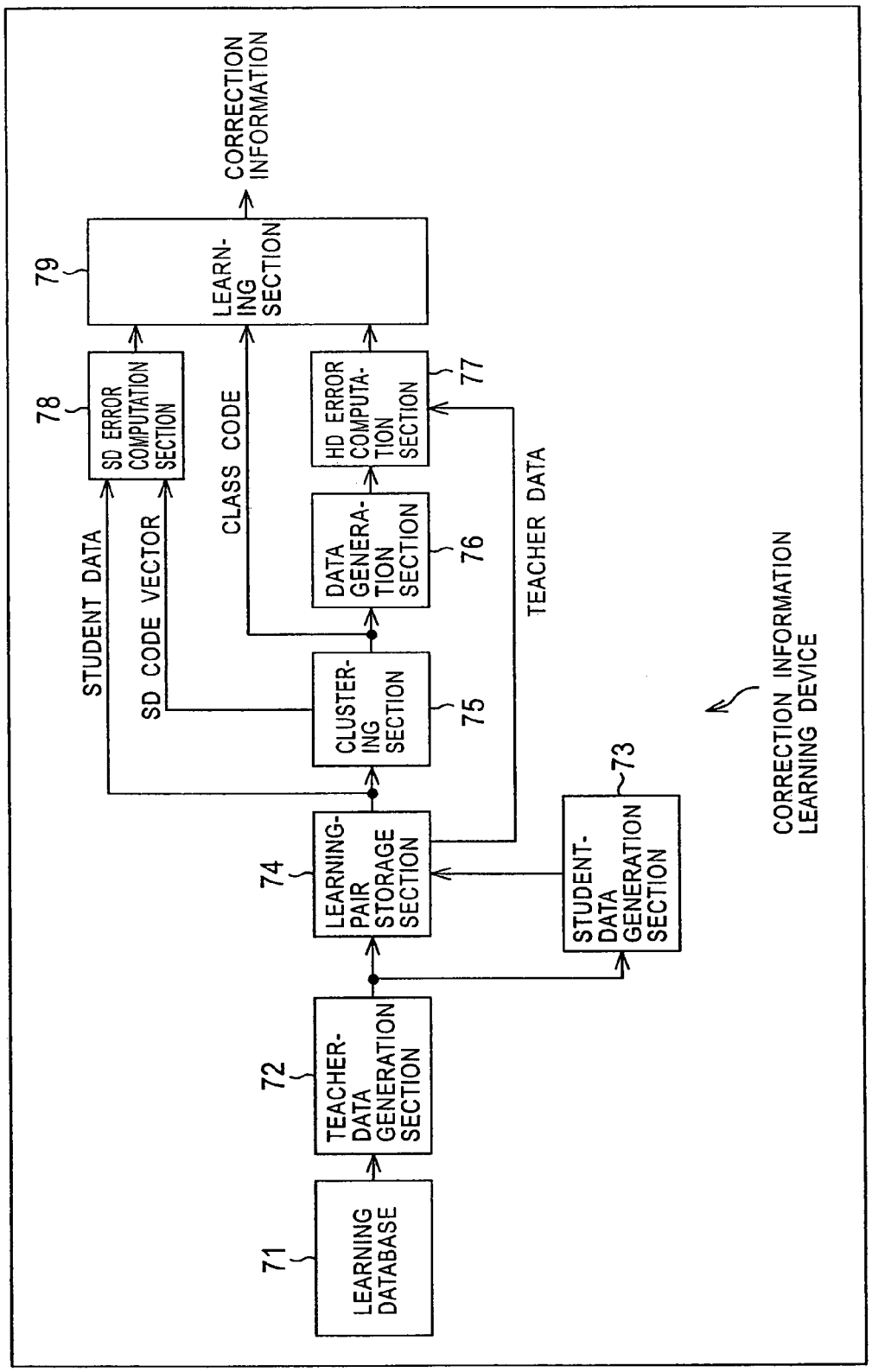
FIG. 13 is a block diagram showing an example of the configuration of an embodiment of a correction information learning device.

Next, FIG. 13 shows an example of the configuration of an embodiment of a correction information learning device for learning correction information stored in the correction information storage section 61 of FIG. 12.

In the embodiment of FIG. 13, a learning database 71, a teacher-data generation section 72, a student-data generation section 73, a learning-pair storage section 74, and a clustering section 75 are configured in the same way as the learning database 31, the teacher-data generation section 32, the student-data generation section 33, the learning-pair storage section 34, and the clustering section 36 of FIG. 6. They perform the same processes as those in the case of FIG. 6.

However, in FIG. 13, the learning image data stored in the learning database 71 may not be the same HD image data as the learning image data stored in the learning database 31 of FIG. 6. That is, in the learning database 71, the same HD image data as the learning image data stored in the learning database 31 of FIG. 6 may be stored, and also, different HD image data may be stored.

Furthermore, in the clustering section 75, the clustering codebook determined in advance in the codebook learning device of FIG. 6 is stored, and by using the clustering codebook, the student data ($p_1$, $p_2$) in the learning pair data stored in the learning-pair storage section 74 is clustered. Furthermore, the clustering section 75 outputs the class code #C obtained by clustering the student data ($p_1$, $p_2$) in the learning pair data, and also outputs the SD code vector ($P_1$, $P_2$) of the class code #C.

The data generation section 76, which is configured in the same way as the data generation section 3 of FIG. 4, receives the class code #C of the student data ($p_1$, $p_2$), which is output by the clustering section 75, generates the HD code vector ($Q_1$, $Q_2$, $Q_3$, $Q_4$) of the class indicated by the class code #C, and supplies the HD code vector to the HD error computation section 77.

The HD error computation section 77 reads, from the learning-pair storage section 74, the teacher data ($q_1$, $q_2$, $q_3$, $q_4$) in the learning pair data used to generate the HD code vector ($Q_1$, $Q_2$, $Q_3$, $Q_4$) to be supplied from the data generation section 76, and determines the relationship between the teacher data ($q_1$, $q_2$, $q_3$, $q_4$) and the HD code vector ($Q_1$, $Q_2$, $Q_3$, $Q_4$). That is, the HD error computation section 77 determines, as the relationship between the teacher data ($q_1$, $q_2$, $q_3$, $q_4$) and the HD code vector ($Q_1$, $Q_2$, $Q_3$, $Q_4$), an HD error vector ($\Delta q_1$, $\Delta q_2$, $\Delta q_3$, $\Delta q_4$) in which, for example, the HD code vector ($Q_1$, $Q_2$, $Q_3$, $Q_4$) is subtracted from the teacher data ($q_1$, $q_2$, $q_3$, $q_4$). Then, the HD error computation section 77 supplies the HD error vector ($\Delta q_1$, $\Delta q_2$, $\Delta q_3$, $\Delta q_4$) to a learning section 79.

An SD error computation section 78 receives the SD code vector ($P_1$, $P_2$) of the class indicated by the class code #C of the student data ($p_1$, $p_2$), which is output by the clustering section 75, and reads, from the learning-pair storage section 74, student data ($p_1$, $p_2$) in the learning pair data used to obtain the SD code vector ($P_1$, $P_2$) in order to determine the relationship between the student data ($p_1$, $p_2$) and the SD code vector ($P_1$, $P_2$). That is, the SD error computation section 78 determines, as the relationship between the student data ($p_1$, $p_2$) and the SD code vector ($P_1$, $P_2$), an SD error vector ($\Delta p_1$, $\Delta p_2$) in which, for example, the SD code vector ($P_1$, $P_2$) is subtracted from the student data ($p_1$, $p_2$). Then, the SD error computation section 78 supplies the SD error vector ($\Delta p_1$, $\Delta p_2$) to the learning section 79.

By using the HD error vectors for all the learning pair data, which are supplied from the HD error computation section 77, and the SD error vectors for all the learning pair data, which are supplied from the SD error computation section 78, the learning section 79 learns, for each class indicated by the class code #C supplied from the clustering section 75, the information in which an HD error vector corresponds to an SD error vector, and outputs the information as correction information.

Figure 14:
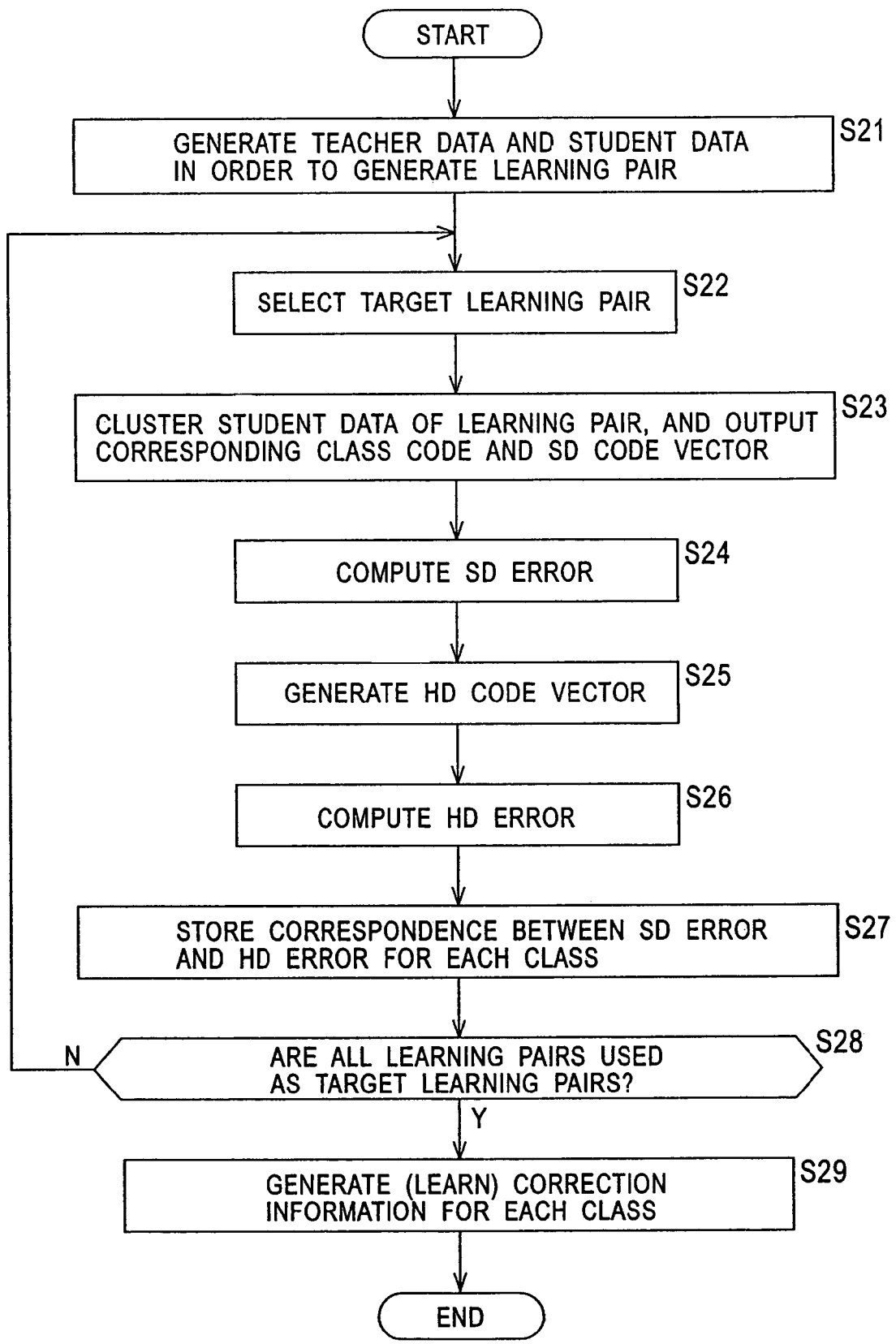
FIG. 14 is a flowchart illustrating processing in the correction information learning device.

A description will now be given, with reference to the flowchart in FIG. 14, processing in the correction information learning device of FIG. 13.

Initially, in step S21, the teacher-data generation section 72 generates teacher data from the learning image data stored in the learning database 71, and supplies the teacher data to the student-data generation section 73 and the learning-pair storage section 74. Furthermore, in step S21, the student-data generation section 73 generates student data from the teacher data supplied from the teacher-data generation section 72, and supplies the student data to the learning-pair storage section 74. Furthermore, in step S21, the learning-pair storage section 74 generates learning pair data by combining the teacher data supplied from the teacher-data generation section 72 and the student data corresponding to the teacher data, which is supplied from the student-data generation section 73, and stores the learning pair data.

As a result, in the learning-pair storage section 74, the learning pair data, which is a combination of the student data and the teacher data, shown in FIG. 8A, is stored.

Thereafter, the process proceeds to step S22, where the clustering section 75 selects, as target learning pair data, one of the learning pair data that is not yet used as target learning pair data from among the learning pair data stored in the learning-pair storage section 74, and the process proceeds to step S23.

In step S23, the clustering section 75 reads the target learning pair data from the learning-pair storage section 74, and clusters the student data ($p_1$, $p_2$) in the target learning pair data. Furthermore, in step S23, the clustering section 75 supplies the class code #C obtained as a result of the clustering to the data generation section 76 and the learning section 79, and supplies the SD code vector ($P_1$, $P_2$) indicated by the class code #C to the SD error computation section 78. The process then proceeds to step S24.

In step S24, the SD error computation section 78 reads the target learning pair data from the learning-pair storage section 74, and subtracts the SD code vector ($P_1$, $P_2$) supplied from the clustering section 75, from the student data ($p_1$, $p_2$) in the target learning pair data in order to determine an SD error vector ($\Delta p_1$, $\Delta p_2$). Furthermore, in step S24, the SD error computation section 78 supplies the SD error vector ($\Delta p_1$, $\Delta p_2$) determined with respect to the target learning pair data to the learning section 79. The process then proceeds to step S25.

In step S25, the data generation section 76 generates HD pixels with regard to the class indicated by the class code #C supplied from the clustering section 75. That is, in step S25, based on the class code #C supplied from the clustering section 75, the data generation section 76 determines the HD code vector ($Q_1$, $Q_2$, $Q_3$, $Q_4$) in the same way as in the case of the data generation section 3 of FIG. 4, and supplies the HD code vector to the HD error computation section 77. The process then proceeds to step S26.

In step S26, the HD error computation section 77 reads the target learning pair data from the learning-pair storage section 74, and subtracts the HD code vector ($Q_1$, $Q_2$, $Q_3$, $Q_4$) supplied from the data generation section 76, from the teacher data ($q_1$, $q_2$, $q_3$, $q_4$) in the teacher data in the target learning pair data in order to determine an HD error vector ($\Delta q_1$, $\Delta q_2$, $\Delta q_3$, $\Delta q_4$). Furthermore, in step S26, the HD error computation section 77 supplies the HD error vector ($\Delta q_1$, $\Delta q_2$, $\Delta q_3$, $\Delta q_4$) determined with respect to the target learning pair data to the learning section 79. The process then proceeds to step S27.

In step S27, the learning section 79 causes the SD error vector ($\Delta p_1$, $\Delta p_2$) obtained similarly for the target learning pair data to correspond to the HD error vector ($\Delta q_1$, $\Delta q_2$, $\Delta q_3$, $\Delta q_4$) for the class code #C obtained with respect to the target learning pair data, and stores the correspondence in its built-in memory (not shown). The process then proceeds to step S28.

In step S28, it is determined whether or not the clustering section 75 has used all the learning pair data stored in the learning-pair storage section 74 as target learning pair data. When it is determined in step S28 that all the learning pair data stored in the learning-pair storage section 74 are not yet used as the target learning pair data, the process returns to step S22; thereafter, similar processes are repeated.

When it is determined in step S28 that all the learning pair data stored in the learning-pair storage section 74 are used as the target learning pair data, the process proceeds to step S29, where the learning section 79 performs learning for causing the SD error vector and the HD error vector, which are stored for each class code, to correspond to each other, thereby generating correction information for each class. The processing is then terminated.

More specifically, the learning section 79 generates, as correction information for each class, an error table, as a LUT (Look-Up Table), in which, for example, the SD error vector ($\Delta p_1$, $\Delta p_2$) and the HD error vector ($\Delta q_1$, $\Delta q_2$, $\Delta q_3$, $\Delta q_4$) correspond to each other for each class, shown in FIG. 15.

In the error table of FIG. 15, in each record (row), the SD error vector ($\Delta p_1$, $\Delta p_2$) and the HD error vector ($\Delta q_1$, $\Delta q_2$, $\Delta q_3$, $\Delta q_4$), which are obtained for certain learning pair data, are made to correspond to each other.

In the correction information storage section 61 of FIG. 12, when the error table of FIG. 15 is stored, the error table of the class code #C supplied from the clustering section 2 (FIG. 1) is read, and this table is supplied to the HD error estimation section 63. In the HD error estimation section 63, the distance (norm) between the SD error vector in each record of the error table of the class code #C and the SD error vector supplied from the feature extraction section 42 is calculated, and the record of the SD error vector at which the distance is minimized is selected from the error table. Furthermore, in the HD error estimation section 63, the HD error vector in the record selected from the error table is read, and the HD error vector is supplied as the correction level to the data correction section 5.

In the above-described case, in the learning section 79, although an error table in which the SD error vector ($\Delta p_1$, $\Delta p_2$) and the HD error vector ($\Delta q_1$, $\Delta q_2$, $\Delta q_3$, $\Delta q_4$), which are obtained for each learning pair data, correspond to each other for each class, is generated, in the learning section 79, furthermore, records in the error table can be integrated. That is, in the learning section 79, a plurality of records in which the SD error vectors ($\Delta p_1$, $\Delta p_2$) and the HD error vectors ($\Delta q_1$, $\Delta q_2$, $\Delta q_3$, $\Delta q_4$) are similar are detected from the records of the error table, and the plurality of records can be integrated as one record.

Here, whether or not the SD error vectors ($\Delta p_1$, $\Delta p_2$) in certain two records are similar can be determined, for example, by determining the distance between the SD error vectors ($\Delta p_1$, $\Delta p_2$) in those two records and by determining whether or not the distance is less than or equal to a predetermined threshold value. That is, when the distance between the SD error vectors ($\Delta p_1$, $\Delta p_2$) in two records is less than or equal to a predetermined threshold value, it can be determined that the SD error vectors ($\Delta p_1$, $\Delta p_2$) in the two records are similar. Whether or not HD error vectors ($\Delta q_1$, $\Delta q_2$, $\Delta q_3$, $\Delta q_4$) in certain two records are similar can also be determined in a similar manner.

As a method for integrating a plurality of records into one record, for example, there is a method for integrating a plurality of records into one record among them. In this case, the plurality of records are deleted from the error table, excluding that one record.

Furthermore, as another method for integrating a plurality of record into one record, there is a method in which, for example, a new one record is generated from a plurality of records, and the plurality of records are integrated into that new record. In this case, for example, the average value of each of the SD error vector and the HD error vector in the plurality of records is determined, and a new record in which the average value of the SD error vectors and the average value of the HD error vectors are made to correspond to each other is added to the error table, and the plurality of the original records are deleted from the error table.

Figure 16A:
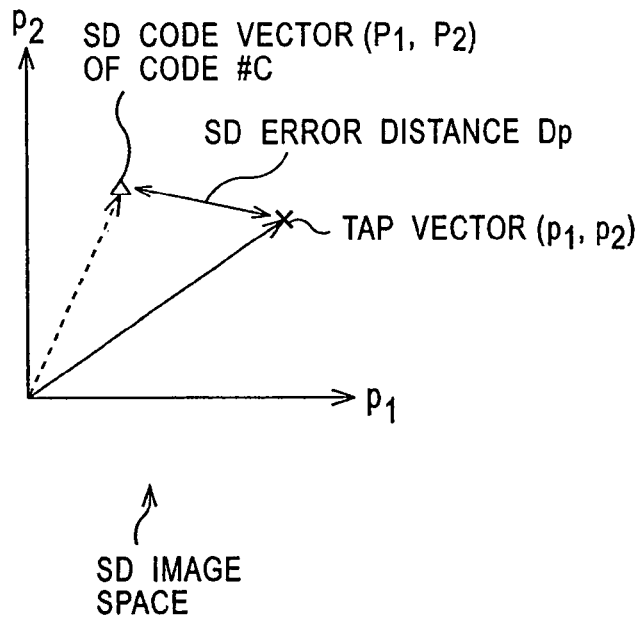
FIG. 16A shows an SD image space.
Figure 16B:
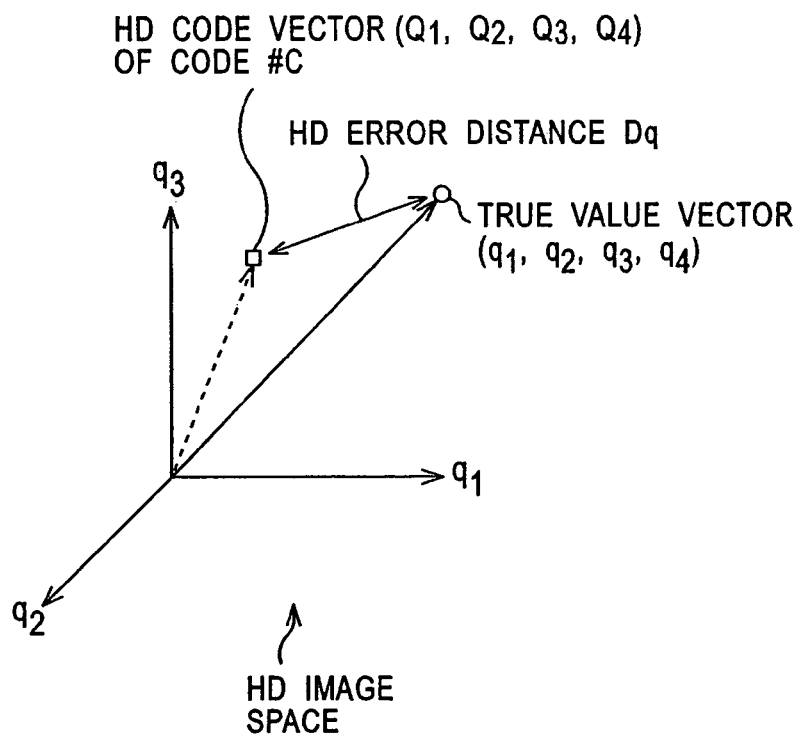
FIG. 16B shows an HD image space.

Next, for example, when, as shown in FIG. 16A, the distance between the tap vector ($p_1$, $p_2$) in the SD image space and the SD code vector ($P_1$, $P_2$) of the class of the tap vector ($p_1$, $p_2$), that is, the magnitude of the SD error vector ($\Delta p_1$, $\Delta p_2$), is assumed to be an SD error distance $D_p$, and when, as shown in FIG. 16B, the distance between the true value vector ($q_1$, $q_2$, $q_3$, $q_4$) corresponding to the tap vector ($p_1$, $p_2$) and the HD code vector ($Q_1$, $Q_2$, $Q_3$, $Q_4$) of the class of the tap vector ($p_1$, $p_2$) in the HD image space, that is, the magnitude of the HD error vector ($\Delta q_1$, $\Delta q_2$, $\Delta q_3$, $\Delta q_4$), is assumed to be an HD error distance Dq, in general, from the viewpoint of the correlation of images, the larger (or the smaller) the SD error distance $D_p$, the larger (or the smaller) the HD error distance $D_q$ becomes.

Figures 17, 18:
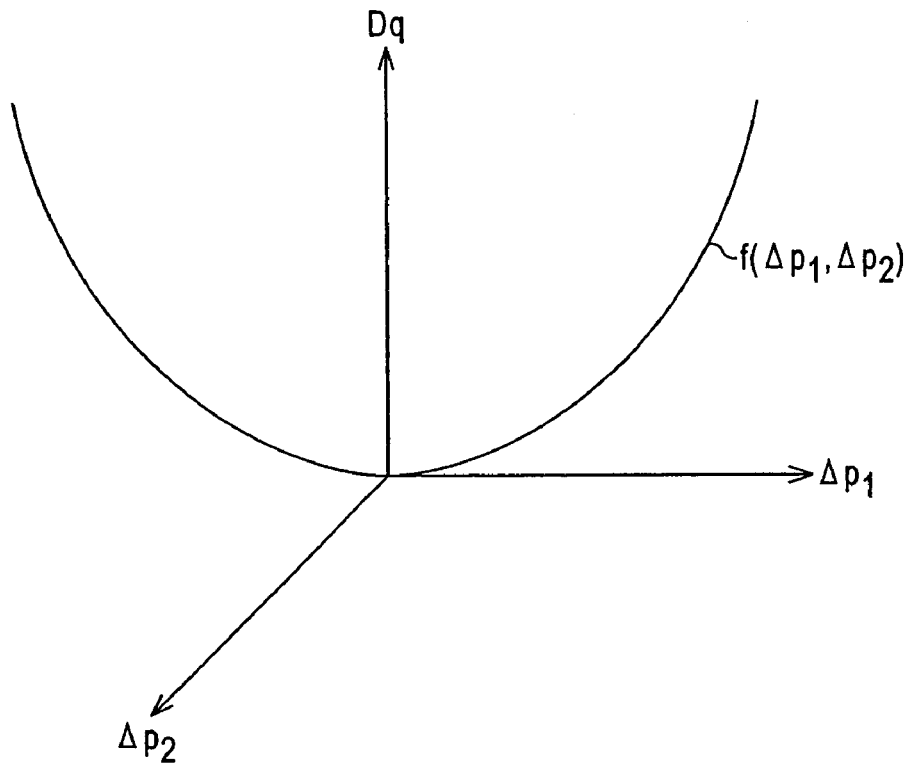
FIG. 17 shows a function for approximating an HD error distance $D_q$.
FIG. 18 shows an example of a coefficient table.

Then, the larger (the absolute value of) the components (SD error) $\Delta p_1$ or $\Delta p_2$ of the SD error vector ($\Delta p_1$, $\Delta p_2$), the larger the SD error distance $D_p$ becomes. Therefore, the HD error distance $D_q$ has a correlation with the SD error $\Delta p_1$ and $\Delta p_2$, and, for example, as shown in FIG. 17, an approximation using a function $f(\Delta p_1, \Delta p_2)$ in which the SD errors $\Delta p_1$ and the $\Delta p_2$ are arguments and which becomes larger as (the absolute values of) the SD errors $\Delta p_1$ and $\Delta p_2$ become larger.

On the other hand, also, similarly to the SD error distance $D_p$, the larger (the absolute value of) the component (HD error) $\Delta q_1$, $\Delta q_2$, $\Delta q_3$, or $\Delta q_4$ of the HD error vector ($\Delta q_1$, $\Delta q_2$, $\Delta q_3$, $\Delta q_4$), the larger the HD error distance $D_q$ becomes.

Therefore, each of the HD errors $\Delta q_1$, $\Delta q_2$, $\Delta q_3$, and $\Delta q_4$ has a correlation with the SD errors $\Delta p_1$ and $\Delta p_2$, and approximation with a function in which the SD errors $\Delta p_1$ and $\Delta p_2$ are arguments is possible.

Accordingly, a description is given of how a function is determined, that is, a method for learning coefficients which define the function (tap coefficients), in a case where certain data y is approximated by a function f( ) in which another plurality of data $x_1$, $x_2$, . . . are arguments.

Assuming that the data y is teacher data for learning the function f( ) and that another plurality of data $x_1$, $x_2$, . . . are student data for the learning, a predictive value E[y] of the teacher data y is determined by a linear first-order combination model which is defined by a linear combination of the set of student data $x_1$, $x_2$, . . . and predetermined tap coefficients $w_1$, $w_2$, . . . In this case, the predictive value E[y] can be expressed by the following equation:

$$E[y] = w_1 x_1 + w_2 x_2 + \quad (1)$$

In order to generalize equation (1), a matrix W composed of a set of tap coefficients $w_j$, a matrix X composed of a set of student data $x_{ij}$, and a matrix Y' composed of a set of predictive values $E[y_j]$ are defined as shown in the following equations, $$X = \begin{pmatrix} x_{11} & x_{12} & \cdots & x_{1J} \\ x_{21} & x_{22} & \cdots & x_{2J} \\ \cdots & \cdots & \cdots & \cdots \\ x_{I1} & x_{I2} & \cdots & x_{IJ} \end{pmatrix} \quad (2)$$

$$W = \begin{pmatrix} W_1 \\ W_2 \\ \cdots \\ W_J \end{pmatrix}, Y' = \begin{pmatrix} E[y_1] \\ E[y_2] \\ \cdots \\ E[y_I] \end{pmatrix}$$

In this case, the following observation equation holds:

$$XW = Y' \quad (3)$$

where a component $x_{ij}$ of the matrix X indicates the j-th student data within the set of the i-th student data (the set of the student data used to predict the i-th teacher data $y_i$), and a component $w_j$ of the matrix W indicates the tap coefficient by which the product with the j-th student data within the set of the student data is computed. Also, $y_i$ indicates the i-th teacher data. Therefore, $E[y_i]$ indicates the predictive value of the i-th teacher data. y in the left side of equation (1) is such that the subscript i of the component $y_i$ of the matrix Y is omitted. Also, $x_1$, $x_2$, . . . in the right side of equation (1) are such that the subscript i of the component $x_{ij}$ of the matrix X is omitted.

The least square method is applied to the observation equation of equation (3) in order to determine the predictive value E[y] close to the data y. In this case, the matrix Y composed of the set of the teacher data y, and a matrix E composed of the residual e of the predictive value E[y] with respect to the teacher data y are defined by the following equations:

$$E = \begin{pmatrix} e_1 \\ e_2 \\ \cdots \\ e_I \end{pmatrix}, Y = \begin{pmatrix} y_1 \\ y_2 \\ \cdots \\ y_I \end{pmatrix} \quad (4)$$

In this case, the following residual equation holds based on equation (3):

$$XW = Y + E \quad (5)$$

In the least square method, as a method for evaluating the tap coefficient $w_j$ for determining the predictive value E[y] close to the teacher data y, for example, the square error expressed by the following equation is employed:

$$\sum_{i=1}^{I} e_i^2 \quad (6)$$

The tap coefficient $w_j$ for determining the predictive value E[y] close to the teacher data y can be determined by minimizing the square error of equation (6).

Therefore, when the square error differentiated by the prediction coefficient $w_j$ becomes 0, it follows that the tap coefficient $w_j$ which satisfies the following equation is the optimum value for determining the predictive value E[y] close to the teacher data y:

$$e_1 \frac{\partial e_1}{\partial w_j} + e_2 \frac{\partial e_2}{\partial w_j} + \ldots + e_I \frac{\partial e_I}{\partial w_j} = 0 \quad (j = 1, 2, \ldots, J) \quad (7)$$

Therefore, first, by differentiating equation (3) by the tap coefficient $w_j$, the following equation holds:

$$\frac{\partial e_i}{\partial w_1} = x_{i1}, \frac{\partial e_i}{\partial w_2} = x_{i2}, \ldots, \frac{\partial e_i}{\partial w_j} = x_{iJ}, (i = 1, 2, \ldots, I) \quad (8)$$

Based on equations (7) and (8), equation (9) is obtained:

$$\sum_{i=1}^{I} e_i x_{i1} = 0, \sum_{i=1}^{I} e_i x_{i2} = 0, \ldots \sum_{i=1}^{I} e_i x_{iJ} = 0 \quad (9)$$

Furthermore, when the relationships among the student data $x_{ij}$, the tap coefficient $w_j$, the teacher data $y_i$, and the residual (error) $e_i$ in the residual equation of equation (5) are considered, the following normalized equation can be obtained based on equation (9):

$$\begin{cases} \left(\sum_{i=1}^{I} x_{i1} x_{i1}\right) w_1 + \left(\sum_{i=1}^{I} x_{i1} x_{i2}\right) w_2 + \ldots + \left(\sum_{i=1}^{I} x_{i1} x_{iJ}\right) w_J = \left(\sum_{i=1}^{I} x_{i1} y_i\right) \\ \left(\sum_{i=1}^{I} x_{i2} x_{i1}\right) w_1 + \left(\sum_{i=1}^{I} x_{i2} x_{i2}\right) w_2 + \ldots + \left(\sum_{i=1}^{I} x_{i2} x_{iJ}\right) w_J = \left(\sum_{i=1}^{I} x_{i2} y_i\right) \\ \ldots \\ \left(\sum_{i=1}^{I} x_{iJ} x_{i1}\right) w_1 + \left(\sum_{i=1}^{I} x_{iJ} x_{i2}\right) w_2 + \ldots + \left(\sum_{i=1}^{I} x_{iJ} x_{iJ}\right) w_J = \left(\sum_{i=1}^{I} x_{iJ} y_i\right) \end{cases} \quad (10)$$

A vector W is defined as shown in equation (2), and a matrix (covariance matrix) A and a vector v are defined by the following equations:

$$A = \begin{pmatrix} \sum_{i=1}^{I} x_{i1}x_{i1} & \sum_{i=1}^{I} x_{i1}x_{i2} & \cdots & \sum_{i=1}^{I} x_{i1}x_{iJ} \\ \sum_{i=1}^{I} x_{i2}x_{i1} & \sum_{i=1}^{I} x_{i2}x_{i2} & \cdots & \sum_{i=1}^{I} x_{i2}x_{iJ} \\ \sum_{i=1}^{I} x_{iJ}x_{i1} & \sum_{i=1}^{I} x_{iJ}x_{i2} & \cdots & \sum_{i=1}^{I} x_{iJ}x_{iJ} \end{pmatrix} \quad (11)$$

$$v = \begin{pmatrix} \sum_{i=1}^{I} x_{i1}y_i \\ \sum_{i=1}^{I} x_{i2}y_i \\ \vdots \\ \sum_{i=1}^{I} x_{iJ}y_i \end{pmatrix}$$

In this case, the normalized equation shown in equation (10) can be expressed by the following equation:

$$AW = v \quad (12)$$

Each normalized equation in equation (10), which is equivalent to equation (12), can be formulated with the same number as the number J of prediction coefficients $w_j$ to be determined by preparing the sets of student data $x_{ij}$ and teacher data $y_i$ by a certain number. Therefore, solving equation (12) with respect to the vector W (to solve equation (12), it is required that the matrix A in equation (12) be regular) enables the optimum prediction coefficient $w_j$ to be determined. When solving equation (12), for example, a sweeping-out method (Gauss-Jordan's elimination method), etc., can be used.

In the learning section 79, in the manner described above, learning for determining the tap coefficient $w_j$ of equation (1) can be performed for each class.

More specifically, in this case, in the learning section 79, a normalization equation of equation (12) is formulated by assuming the HD error $\Delta q_1$ output by the HD error computation section 77 to be the teacher data y for each class code #C output by the clustering section 75, and the SD errors $\Delta p_1$ and $\Delta p_2$ output by the SD error computation section 78 to be the student data x. Furthermore, in the learning section 79, by solving the normalization equation, the tap coefficients $w_1$ and $w_2$ for determining the predicative value $\Delta q_1'$ of the true value $\Delta q_1$ of the HD error by using an equation $\Delta q_1' = w_1 \Delta p_1 + w_2 \Delta p_2$ corresponding to equation (1) are determined. Furthermore, in the learning section 79, for each of the other HD errors $\Delta q_2$, $\Delta q_3$, and $\Delta q_4$ output by the HD error computation section 77, the tap coefficients $w_1$ and $w_2$ are determined in a similar manner.

Then, in the learning section 79, a coefficient table for each class, such as that shown in, for example, FIG. 18, of the tap coefficients $w_1$ and $w_2$, which are determined, for each class, for each of the HD errors $\Delta q_1$, $\Delta q_2$, $\Delta q_3$, and $\Delta q_4$, is generated.

Here, in FIG. 18, the tap coefficients which are multiplied by the SD errors $\Delta p_1$ and $\Delta p_2$ in order to determine the HD error $\Delta q_j$ are indicated as $w_1^{(j)}$ and $w_2^{(j)}$, respectively, where j=1, 2, 3, and 4.

In the learning section 79, when the coefficient table for each class, shown in FIG. 18, is determined, this coefficient table for each class is stored as correction information in the correction information storage section 61 of FIG. 12.

Then, in the correction information storage section 61, the coefficient table of the class code #C supplied from the clustering section 2 (FIG. 1) is read, and this table is supplied to the HD error estimation section 63. In the HD error estimation section 63, by using the coefficient table of the class code #C and the SD error vector ($\Delta p_1$, $\Delta p_2$) supplied from the feature extraction section 42, equation $\Delta q_j' = w_1^{(j)} \Delta p_1 + w_2^{(j)} \Delta p_2$ is calculated, thereby determining (the predictive value of) the HD error $\Delta q_j'$, and an HD error vector ($\Delta q_1'$, $\Delta q_2'$, $\Delta q_3'$, $\Delta q_4'$) in which the HD error $\Delta q_j'$ is components is supplied, as the correction level, to the data correction section 5.

Figure 19:
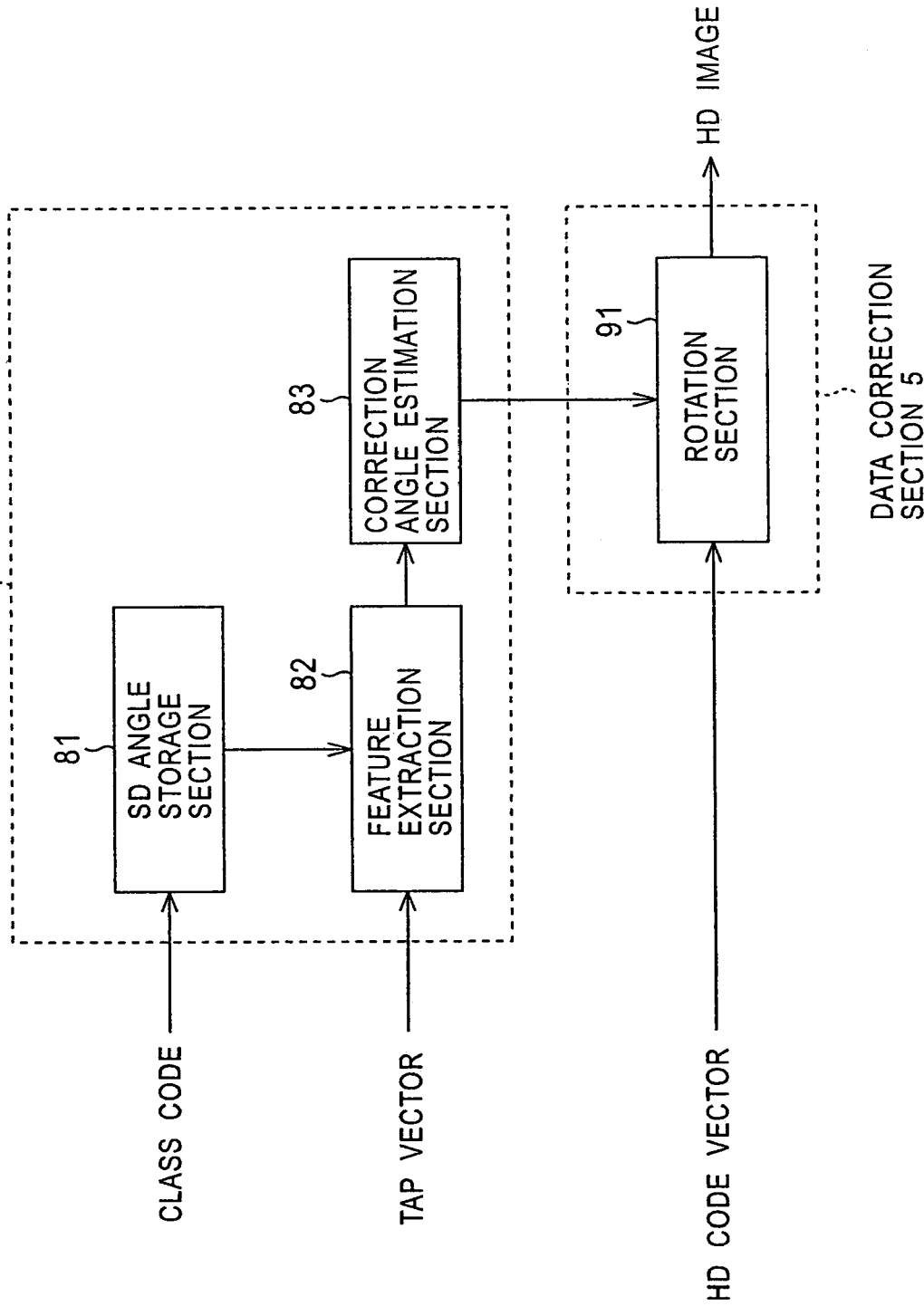
FIG. 19 is a block diagram showing a third example of the configuration of a correction level calculation section 4 and a data correction section 5.

Next, FIG. 19 shows a third example of the configuration of the correction level calculation section 4 and the data correction section 5 of FIG. 1.

In the embodiment of FIG. 19, the correction level calculation section 4 is formed of an SD angle storage section 81, a feature extraction section 82, and a correction angle estimation section 83; and the data correction section 5 is formed of a rotation section 91.

The SD angle storage section 81 has stored therein an SD angle table in which each class code and an SD angle $\theta_{SD}$ (to be described later) correspond to each other, and supplies, to the feature extraction section 82, the SD angle $\theta_{SD}$ corresponding to the class code #C of the tap vector ($p_1$, $p_2$), which is supplied from the clustering section 2 (FIG. 1).

Here, the SD angle $\theta_{SD}$ for each class code #C in the SD angle table is, for example, an angle indicating the rate of change of (the pixel values of) the SD pixels $P_1$ and $P_2$, which are components of the SD code vector ($P_1$, $P_2$) of the class code #C indicated by the class code #C, and it is determined by, for example, equation $\theta_{SD} = \tan^{-1}(P_2 - P_1)$.

Therefore, for example, as shown in FIG. 20A, in the clustering codebook stored in the codebook storage section 21 of FIG. 4, if it is assumed that a vector ($P_1(c)$, $P_2(c)$) is registered as the SD code vector of the class indicated by the class code #C, in the SD angle storage section 81 of FIG. 19, an SD angle table, such as that shown in, for example, FIG. 20B, in which an SD angle $\theta_{SD}(c)$ determined by equation $\theta_{SD}(c) = \tan^{-1}(P_2(c) - P_1(c))$ corresponds to each class code #C, is stored.

The SD angle $\theta_{SD}$ for the SD code vector of the class of the tap vector is supplied from the SD angle storage section 81 to the feature extraction section 82, and also, the tap vector ($p_1$, $p_2$) output by the tap extraction section 1 is supplied to the feature extraction section 82. In a manner similar to determining the SD angle $\theta_{SD}$ from the SD code vector, the feature extraction section 82 determines, from the tap vector ($p_1$, $p_2$), the angle $\theta_t$ indicating the rate of change of (the pixel values of) the SD pixels $p_1$ and $p_2$ (hereinafter referred to as a "tap angle" where appropriate), which are the components of the tap vector ($p_1$, $p_2$). Furthermore, the feature extraction section 82 subtracts, from the tap angle $\theta_t$, the SD angle $\theta_{SD}$ supplied from the SD angle storage section 81 in order to determine the error angle $\Delta\theta$ (hereinafter referred to as an "SD error angle" where appropriate), with respect to the tap angle $\theta_t$, of the SD angle $\theta_{SD}$.

That is, since the SD angle $\theta_{SD}$ for the SD code vector ($P_1$, $P_2$) is determined by, for example, equation $\theta_{SD} = \tan^{-1}(P_2 - P_1)$ in the manner described above, the SD angle $\theta_{SD}$ indicates the inclination of the straight line $P_1P_2$ (the straight line connecting the points $P_1$ and $P_2$) in a case where the distance between the SD pixels $P_1$ and $P_2$ is set at 1, as shown in FIG. 21A. Also, for the tap vector ($p_1$, $p_2$), since the tap angle $\theta_t$ is determined by, for example, equation $\theta_t = \tan^{-1}(p_2 - p_1)$, this tap angle $\theta_t$ also indicates the inclination of the straight line $p_1p_2$ when the distance between the SD pixels $P_1$ and $P_2$ is set at 1, as shown in FIG. 21B. As shown in FIG. 21B, the feature extraction section 82 determines the difference in the inclinations of these two straight lines $P_1P_2$ and $p_1p_2$ as the SD error angle $\Delta\theta$.

Here, in FIG. 21 (the same applies to FIGS. 22 and 29 (to be described later)), the vertical axis indicates the pixel value, and the horizontal axis indicates the position of the pixel.

When the feature extraction section 82 determines the SD error angle $\Delta\theta$ in the above-described manner, the feature extraction section 82 supplies this SD error angle $\Delta\theta$, as the features of the tap vector $(p_1, p_2)$, to the correction angle estimation section 83.

Based on the SD error angle $\Delta\theta$ supplied from the feature extraction section 82, the correction angle estimation section 83 determines the correction level for correcting the HD code vector $(Q_1, Q_2, Q_3, Q_4)$ output by the data generation section 3 (FIG. 1).

More specifically, based on the SD error angle $\Delta\theta$, the correction angle estimation section 83 estimates an error angle with respect to the angle $\theta_{qj,j+1}$ (hereinafter referred to as a "true value angle" where appropriate) indicating the rate of change of (the pixel values) of the adjacent HD pixels $q_j$ and $q_{j+1}$ among the HD pixels as the components of the true value vector $(q_1, q_2, q_3, q_4)$ of the HD image data corresponding to the tap vector $(p_1, p_2)$, of the angle (hereinafter referred to as an "HD angle" where appropriate) $\theta_{HDj,j+1}$ indicating the rate of change of (the pixel values of) the adjacent HD pixels $Q_j$ and $Q_{j+1}$ as the components of the HD code vector $(Q_1, Q_2, Q_3, Q_4)$ of the tap vector $(p_1, p_2)$. More specifically, the correction angle estimation section 83 assumes, for example, the SD error angle $\Delta\theta$ directly as an HD error angle.

Then, the correction angle estimation section 83 supplies the HD error angle, as the correction level, to the data correction section 5.

In the data correction section 5, the HD code vector $(Q_1, Q_2, Q_3, Q_4)$ is corrected by rotating the angle (HD angle) indicating the rate of change of (the pixel values of) the adjacent HD pixels $Q_j$ and $Q_{j+1}$ among the HD pixels as the components of the HD code vector $(Q_1, Q_2, Q_3, Q_4)$ of the class code #C of the tap vector $(p_1, p_2)$, which is supplied from the data generation section 3 (FIG. 1), by the HD error angle $\Delta\theta$ as the correction level supplied from (the correction angle estimation section 83 of) the correction level calculation section 4 in the rotation section 91.

More specifically, for example, as shown in FIG. 21C, the HD angle indicating the rate of change of the adjacent HD pixels $Q_1$ and $Q_2$ among the HD pixels as the components of the HD code vector $(Q_1, Q_2, Q_3, Q_4)$ supplied from the data generation section 3 (FIG. 1) is denoted as $\theta_{HD12}$. Similarly, the HD angle indicating the rate of change of the HD pixels $Q_2$ and $Q_3$ is denoted as $\theta_{HD23}$, and the HD angle indicating the rate of change of the HD pixels $Q_3$ and $Q_4$ is denoted as $\theta_{HD34}$.

Here, the HD angle $\theta_{HD12}$ can be represented as, for example, equation $\theta_{HD12}=\tan^{-1}((Q_2-Q_1)/0.5)$. The reason why the denominator of the argument $(Q_2-Q_1)/0.5$ of the function $\tan^{-1}$ is 0.5 is that, due to the relationship between the SD pixels and the HD pixels described with reference to FIG. 3, when the distance between the SD pixels $p_1$ and $p_2$ is set at 1 in the manner described above, the distance between the HD pixels $Q_1$ and $Q_2$ is 0.5, which is half of the above case. The same applies to the set of the other adjacent HD pixels $Q_2$ and $Q_3$, and $Q_3$ and $Q_4$.

As shown in FIG. 21D, the rotation section 91 of the data correction section 5 rotates the straight line $Q_1Q_2$, for example, by an HD error angle $\Delta\theta$ about the HD pixel $Q_1$, so that the pixel values indicated by the points at the positions of the HD pixels $Q_1$ and $Q_2$ in the straight line after the rotation are denoted as the corrected HD pixels $q_1'$ and $q_2'$, respectively. Furthermore, the rotation section 91 rotates the straight line $Q_2Q_3$, for example, by an HD error angle $\Delta\theta$ about the HD pixels $Q_2$, so that the pixel value indicated by the point at the position of the HD pixel $Q_3$ in the rotated straight line is assumed as the pixel value of the corrected HD pixel $q_3'$. Furthermore, the rotation section 91 rotates the straight line $Q_3Q_4$, for example, by an HD error angle $\Delta\theta$ about the HD pixel $Q_3$, so that the pixel value indicated by the point at the position of the HD pixel $Q_4$ in the rotated straight line is assumed as the pixel value of the corrected HD pixel $q_4'$.

Figure 22A:
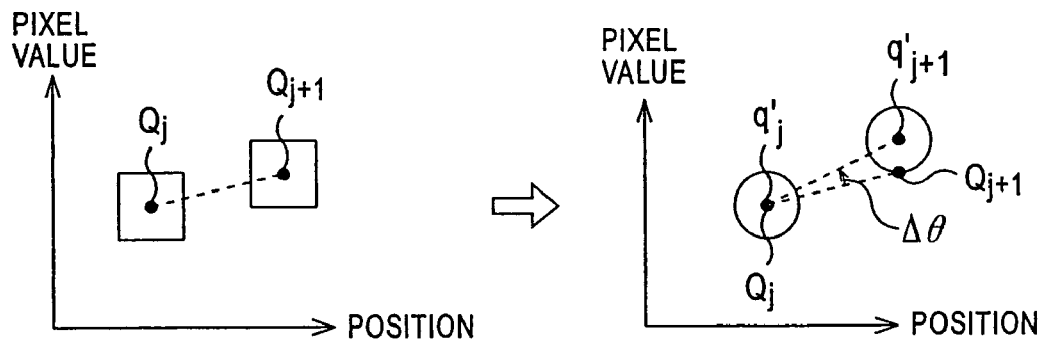
FIG. 22A illustrates processing in the rotation section 91.
Figure 22B:
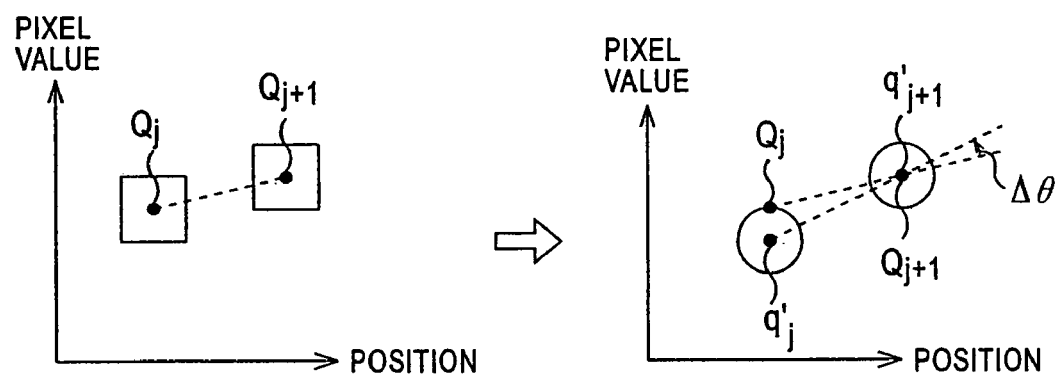
FIG. 22B illustrates processing in the rotation section 91.
Figure 22C:
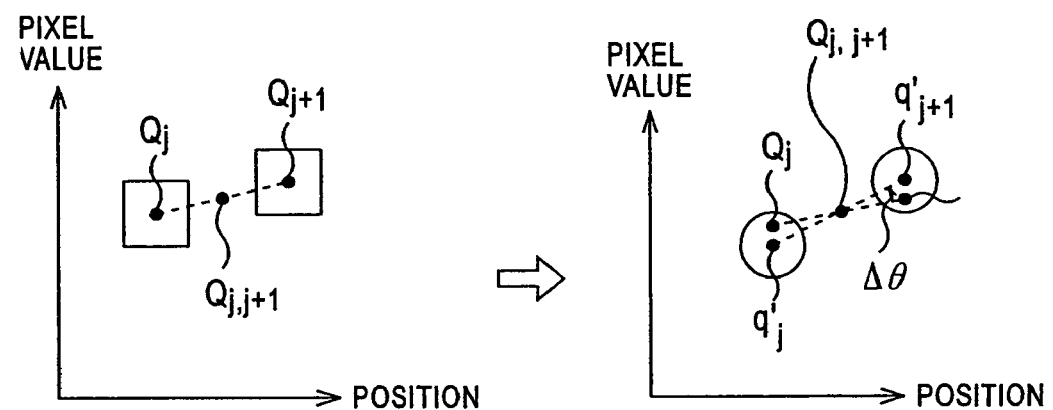
FIG. 22C illustrates processing in the rotation section 91.

In the above-described case, as shown in FIG. 22A, in the rotation section 91, the straight line $Q_jQ_{j+1}$ connecting the adjacent HD pixels $Q_j$ and $Q_{j+1}$ among the HD pixels as the components of the HD code vector $(Q_1, Q_2, Q_3, Q_4)$ is rotated by the HD error angle $\Delta\theta$ about the HD pixel $Q_j$ on the left side. Alternatively, for example, as shown in FIG. 22B, the straight line $Q_jQ_{j+1}$ connecting the HD pixels $Q_j$ and $Q_{j+1}$ may be rotated by an HD error angle $\Delta\theta$ about the HD pixel $Q_{j+1}$ on the right side, and it may be rotated by an HD error angle $\Delta\theta$ about the middle point $Q_{j,j+1}$ of the line segment $Q_jQ_{j+1}$ connecting the HD pixels $Q_j$ and $Q_{j+1}$.

Figure 23:
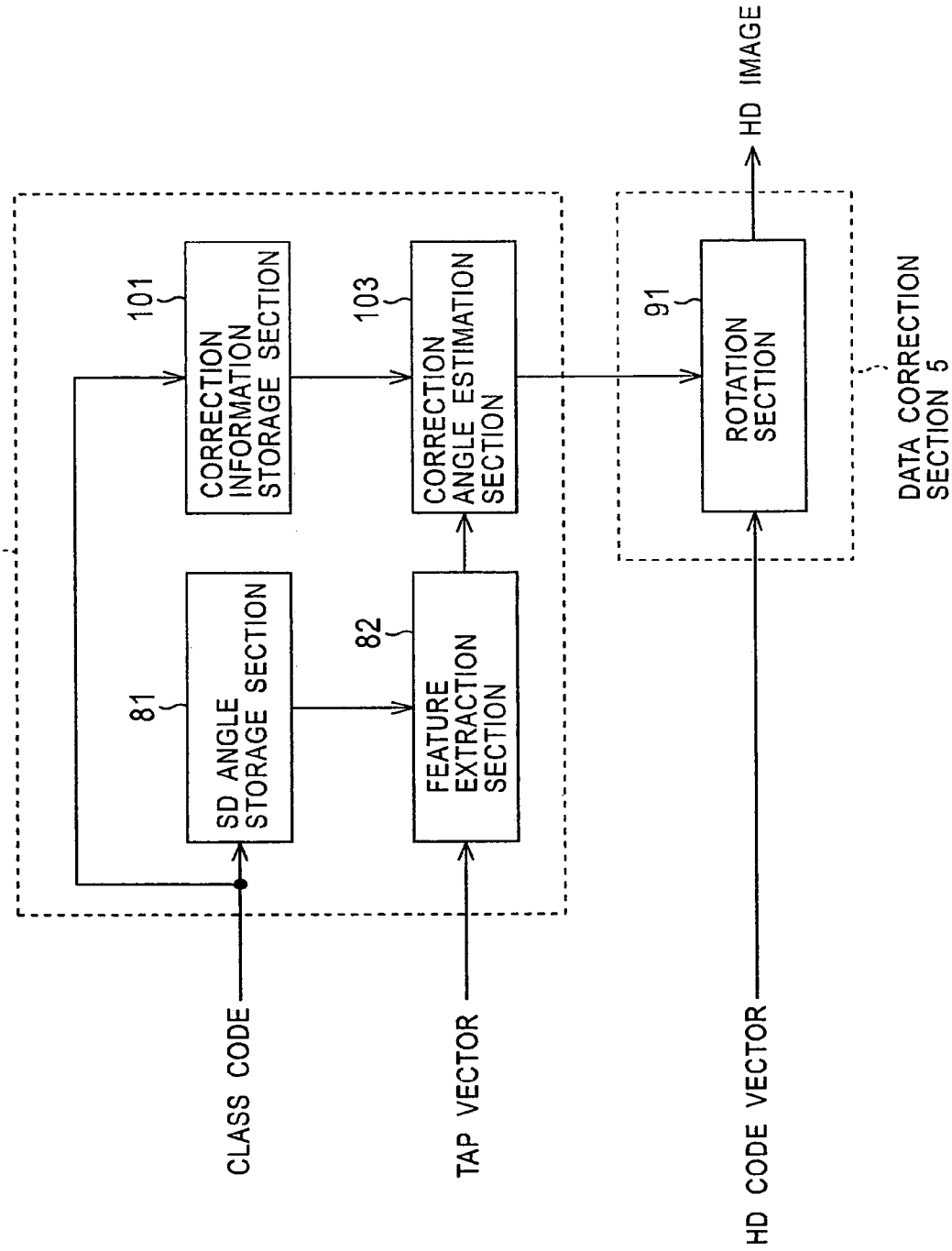
FIG. 23 is a block diagram showing a fourth example of the configuration of a correction level calculation section 4 and the data correction section 5.

Next, FIG. 23 shows a fourth example of the configuration of the correction level calculation section 4 and the data correction section 5 of FIG. 1. Components in FIG. 23, which correspond to those in FIG. 19, are designated with the same reference numerals, and descriptions thereof are omitted where appropriate. That is, in FIG. 23, the correction level calculation section 4 is configured in the same way as in the case of FIG. 19 except that a correction information storage section 101 is newly provided and a correction angle estimation section 103 is newly provided in place of the correction angle estimation section 83. In FIG. 23, the data correction section 5 is configured in the same way as in the case of FIG. 19.

Therefore, also, in the embodiment of FIG. 23, similarly to the case in FIG. 19, in the SD angle storage section 81 and the feature extraction section 82, the SD error angle $\Delta\theta$ is determined as the features of the tap vector $(p_1, p_2)$, and this angle is supplied to the correction angle estimation section 103.

On the other hand, the correction information storage section 101 has stored therein correction information for determining the correction level for correcting the HD code vector $(Q_1, Q_2, Q_3, Q_4)$ in the data correction section 5. Here, this correction information is determined for each class by, for example, learning, and the learning method will be described later.

The class code #C of the tap vector $(p_1, p_2)$ is supplied to the correction information storage section 101 from the clustering section 2 (FIG. 4). The correction information storage section 101 reads the correction information of the class indicated by the class code #C of the tap vector $(p_1, p_2)$ from among the correction information for each class, which is stored therein, and supplies the correction information to the correction angle estimation section 103.

The correction angle estimation section 103 estimates the HD error angle as the correction level on the basis of the correction information of the class of the tap vector $(p_1, p_2)$, which is supplied from the correction information storage section 101, and the SD error angle $\Delta\theta$ as the features of the tap vector $(p_1, p_2)$, which is supplied from the feature extraction section 82, and supplies the HD error angle to the data correction section 5.

Thereafter, in the data correction section 5, similarly to the case in FIG. 19, the HD code vector $(Q_1, Q_2, Q_3, Q_4)$ of the class code #C of the tap vector $(p_1, p_2)$ is corrected by the HD error angle as the correction level from the correction angle estimation section 103.

Figure 24:
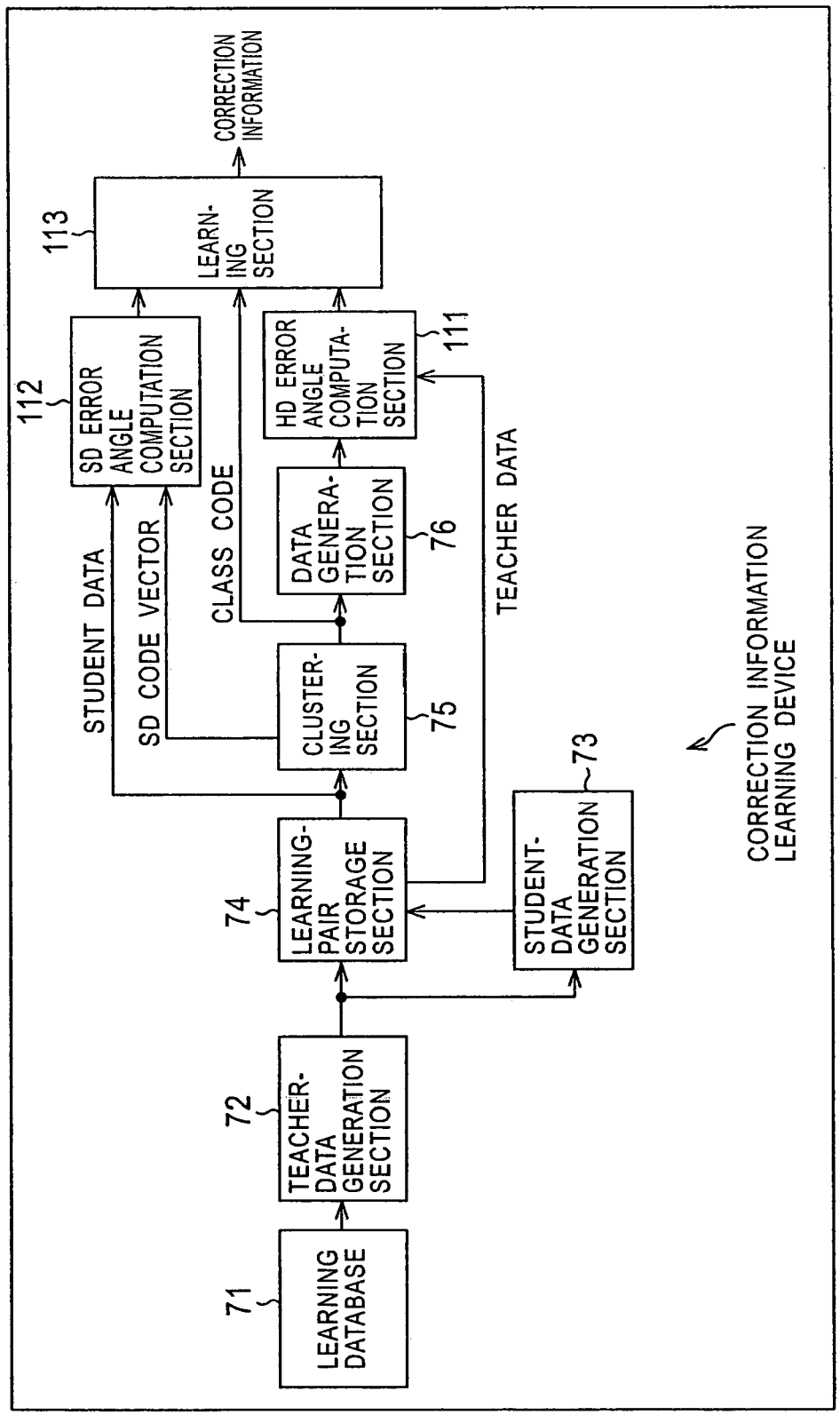
FIG. 24 is a block diagram showing an example of the configuration of another embodiment of a correction information learning device.

Next, FIG. 24 shows an example of the configuration of an embodiment of a correction information learning device for learning correction information stored in the correction information storage section 101 of FIG. 23. Components in FIG. 24, which correspond to those in FIG. 13, are designated with the same reference numerals, and in the following, descriptions thereof are omitted where appropriate. That is, the correction information learning device of FIG. 24 is configured in the same way as in the case of FIG. 13 except that the HD error computation section 77, the SD error computation section 78, and the learning section 79 are replaced with the HD error angle computation section 111, the SD error angle computation section 112, and the learning section 113, respectively.

The HD error angle computation section 111 reads, from the learning-pair storage section 74, the teacher data ($q_1$, $q_2$, $q_3$, $q_4$) in the learning pair data used to generate the HD code vector ($Q_1$, $Q_2$, $Q_3$, $Q_4$) to be supplied from the data generation section 76, and determines the relationship between the teacher data ($q_1$, $q_2$, $q_3$, $q_4$) and the HD code vector ($Q_1$, $Q_2$, $Q_3$, $Q_4$). That is, the HD error angle computation section 111 determines, as a relationship between the teacher data ($q_1$, $q_2$, $q_3$, $q_4$) and the HD code vector ($Q_1$, $Q_2$, $Q_3$, $Q_4$), for example, HD error angles $\Delta\theta_{HD12}$, $\Delta\theta_{HD23}$, and $\Delta\theta_{HD34}$ in which, for example, each of the HD angles indicating the inclinations of the straight lines $Q_1Q_2$, $Q_2Q_3$, and $Q_3Q_4$, which connect the adjacent HD pixels in the HD code vector ($Q_1$, $Q_2$, $Q_3$, $Q_4$), is subtracted from each of the HD angles indicating the inclinations of the straight lines $q_1q_2$, $q_2q_3$, and $q_3q_4$, which connect the adjacent HD pixels in the teacher data ($q_1$, $q_2$, $q_3$, $q_4$). Then, the HD error angle computation section 111 supplies the HD error angles $\Delta\theta_{HD12}$, $\Delta\theta_{HD23}$, and $\Delta\theta_{HD34}$ to the learning section 113.

The SD error angle computation section 112 receives the SD code vector ($P_1$, $P_2$) of the class indicated by the class code #C of the student data ($p_1$, $p_2$), which is output by the clustering section 75, and reads, from the learning-pair storage section 74, the student data ($p_1$, $p_2$) in the learning pair data used to obtain the SD code vector ($P_1$, $P_2$) in order to determine the relationship between the student data ($p_1$, $p_2$) and the SD code vector ($P_1$, $P_2$). That is, the SD error angle computation section 112 determines, as a relationship between the student data ($p_1$, $p_2$) and the SD code vector ($P_1$, $P_2$), for example, an SD error angle $\Delta\theta_{SD}$ in which the SD angle indicating the inclination of the straight line $P_1P_2$ connecting the adjacent SD pixels in the SD code vector ($P_1$, $P_2$) is subtracted from the SD angle indicating the inclination of the straight line $p_1p_2$ connecting the adjacent SD pixels in the student data ($p_1$, $p_2$). Then, the SD error angle computation section 112 supplies the SD error angle $\Delta\theta_{SD}$ to the learning section 113.

The learning section 113 learns, for each class indicated by the class code #C supplied from the clustering section 75, the information in which the HD error angle and the SD error angle correspond to each other, by using the HD error angles for all the learning pair data, which are supplied from the HD error angle computation section 111, and the SD error angles for all the learning pair data, which are supplied from the SD error angle computation section 112, and outputs the information as the correction information.

Figure 25:
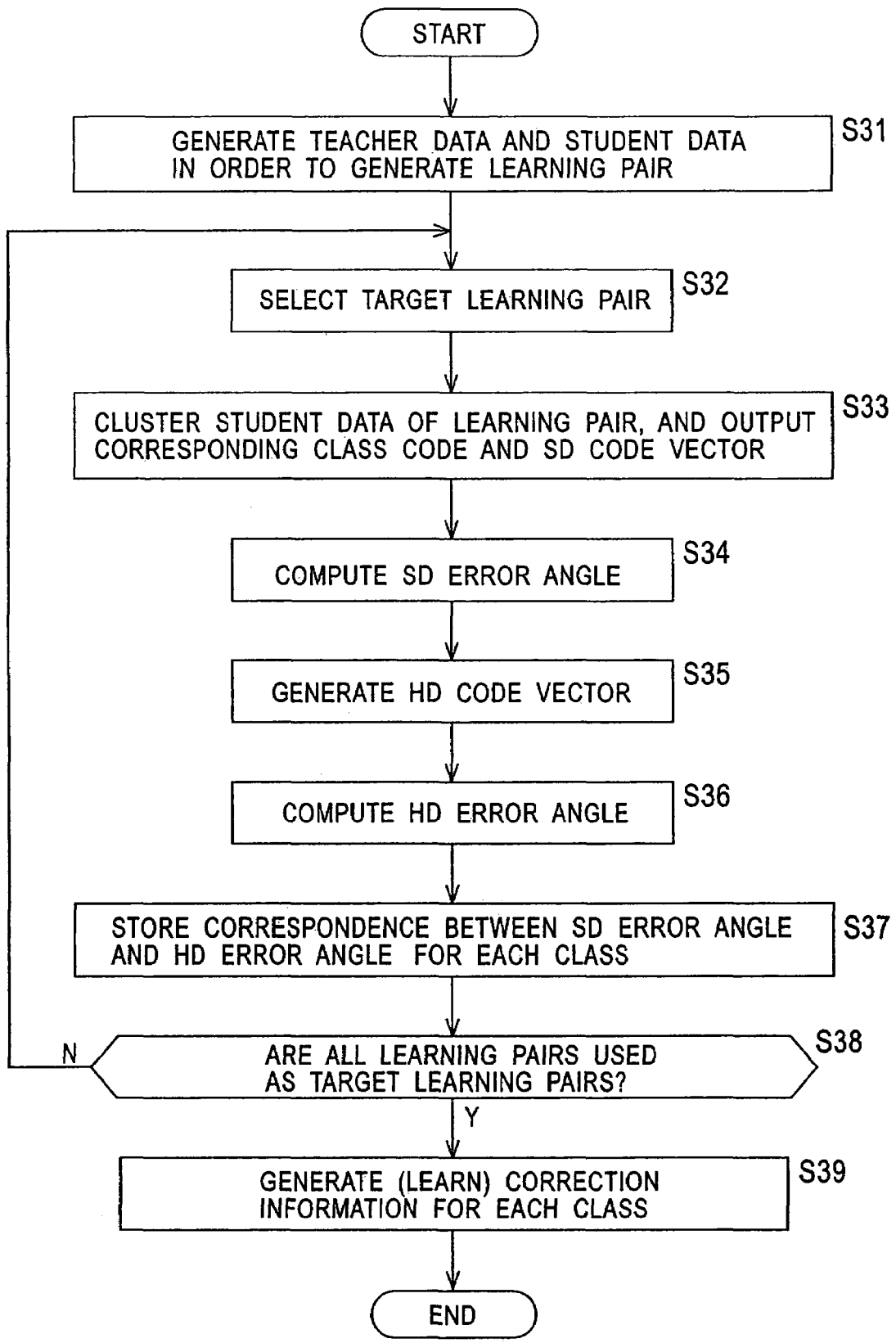
FIG. 25 is a flowchart illustrating processing in the correction information learning device.

A description will now be given, with reference to the flowchart in FIG. 25, processing in the correction information learning device of FIG. 24.

Initially, in step S31, the teacher-data generation section 72 generates teacher data from the data for learning an image, stored in the learning database 71, and supplies the teacher data to the student-data generation section 73 and the learning-pair storage section 74. Furthermore, in step S31, the student-data generation section 73 generates student data from the teacher data supplied from the teacher-data generation section 72, and supplies the student data to the learning-pair storage section 74. Furthermore, in step S31, the learning-pair storage section 74 generates learning pair data by combining the teacher data supplied from the teacher-data generation section 72, and the student data corresponding to the teacher data, which is supplied from the student-data generation section 73, and stores the learning pair data.

Thereafter, the process proceeds to step S32, where the clustering section 75 selects, as target learning pair data, one of the learning pair data stored in the learning-pair storage section 74 that is not yet used as the target learning pair data, and the process proceeds to step S33.

In step S33, the clustering section 75 reads the target learning pair data from the learning-pair storage section 74, and clusters the student data ($p_1$, $p_2$) in the target learning pair data. Furthermore, in step S33, the clustering section 75 supplies the class code #C obtained as a result of the clustering to the data generation section 76 and the learning section 113, and supplies the SD code vector ($P_1$, $P_2$) of the class indicated by the class code #C to the SD error angle computation section 112. Then, the process proceeds to step S34.

In step S34, the SD error angle computation section 112 reads the target learning pair data from the learning-pair storage section 74, and subtracts the SD angle for the SD code vector ($P_1$, $P_2$) supplied from the clustering section 75, from the SD angle for the student data ($p_1$, $p_2$) in that target learning pair data in order to determine an SD error angle $\Delta\theta_{SD}$. Furthermore, in step S34, the SD error angle computation section 112 supplies, to the learning section 113, the SD error angle $\Delta\theta_{SD}$ determined with respect to the target learning pair data, and then the process proceeds to step S35.

In step S35, the data generation section 76 generates HD pixels with regard to the class indicated by the class code #C supplied from the clustering section 75. That is, in step S35, based on the class code #C supplied from the clustering section 75, the data generation section 76 determines the HD code vector ($Q_1$, $Q_2$, $Q_3$, $Q_4$) in the same manner as in the case of the data generation section 3 of FIG. 4, and supplies the HD code vector to the HD error angle computation section 111. The process then proceeds to step S36.

In step S36, the HD error angle computation section 111 reads the target learning pair data from the learning-pair storage section 74, and subtracts the HD angle for the HD code vector ($Q_1$, $Q_2$, $Q_3$, $Q_4$) supplied from the data generation section 76, from the HD angle for the teacher data ($q_1$, $q_2$, $q_3$, $q_4$) in that target learning pair data in order to determine HD error angles $\Delta\theta_{HD12}$, $\Delta\theta_{HD23}$, and $\Delta\theta_{HD34}$.

More specifically, if the HD angles indicating the inclinations of the straight lines $q_1q_2$, $q_2q_3$, and $q_3q_4$, which connect the adjacent HD pixels in the teacher data ($q_1$, $q_2$, $q_3$, $q_4$) are denoted as $\theta_{HD}(q_1q_2)$, $\theta_{HD}(q_2q_3)$, and $\theta_{HD}(q_3q_4)$, respectively, and if the HD angles indicating the inclinations of the straight lines $Q_1Q_2$, $Q_2Q_3$, and $Q_3Q_4$, which connect the adjacent HD pixels in the HD code vector ($Q_1$, $Q_2$, $Q_3$, $Q_4$) are denoted as $\theta_{HD}(Q_1Q_2)$, $\theta_{HD}(Q_2Q_3)$, and $\theta_{HD}(Q_3Q_4)$, respectively, the HD error angle computation section 111 determines $\theta_{HD}(q_1q_2)-\theta_{HD}(Q_1Q_2)$, $\theta_{HD}(q_2q_3)-\theta_{HD}(Q_2Q_3)$, and $\theta_{HD}(q_3q_4)-\theta_{HD}(Q_3Q_4)$ as HD error angles $\Delta\theta_{HD12}$, $\Delta\theta_{HD23}$, and $\Delta\theta_{HD34}$, respectively.

Furthermore, in step S36, the HD error angle computation section 111 supplies, to the learning section 113, the HD error angles $\Delta\theta_{HD12}$, $\Delta\theta_{HD23}$, and $\Delta\theta_{HD34}$ determined with respect to the target learning pair data, and the process then proceeds to step S37.

In step S37, the learning section 113 causes the SD error angle $\Delta\theta_{SD}$, which is obtained similarly with respect to the target learning pair data, to correspond to each other the HD error angles $\Delta\theta_{HD12}$, $\Delta\theta_{HD23}$, and $\Delta\theta_{HD34}$, with regard to the class code #C obtained with respect to the target learning pair data, and stores the correspondence in its built-in memory (not shown). The process then proceeds to step S38.

In step S38, the clustering section 75 determines whether or not all the learning pair data stored in the learning-pair storage section 74 are used as the target learning pair data. When it is determined in step S38 that all the learning pair data stored in the learning-pair storage section 74 are not yet used as the target learning pair data, the process returns to step S32; thereafter, similar processes are repeated.

Furthermore, when it is determined in step S38 that all the learning pair data stored in the learning-pair storage section 74 are used as the target learning pair data, the process returns to step S39, where the learning section 113 performs learning for causing the SD error angle and the HD error angle, which are stored for each class code, to correspond to each other. As a result, correction information for each class is generated, and the processing is terminated.

More specifically, the learning section 113 generates, as correction information for each class, an error angle table as an LUT, in which the SD error angle $\Delta\theta_{SD}$ and the HD error angles $\Delta\theta_{HD12}$, $\Delta\theta_{HD23}$, and $\Delta\theta_{HD34}$ correspond to each other for each class, such as that shown in, for example, FIG. 26.

Here, in the error angle table of FIG. 26, in each record (row), the SD error angle $\Delta\theta_{SD}$ and the HD error angles $\Delta\theta_{HD12}$, $\Delta\theta_{HD23}$, and $\Delta\theta_{HD34}$, which are obtained for certain learning pair data, correspond to each other.

In the correction information storage section 101 of FIG. 23, in a case where the error angle table of FIG. 26 is stored, the error angle table of the class code #C supplied from the clustering section 2 (FIG. 1) is read, and this table is supplied to the correction angle estimation section 103. In the correction angle estimation section 103, for example, the absolute difference value between the SD error angle in each record of the error angle table of the class code #C and the SD error angle supplied from the feature extraction section 82 is calculated, and the record of the SD error angle that minimizes the absolute difference value is selected from the error angle table. Furthermore, in the correction angle estimation section 103, the HD error angle in the record selected from the error angle table is read, and the HD error angle is supplied as the correction level to the data correction section 5.

In the above-described case, in the learning section 113, an error angle table is generated in which the SD error angle $\Delta\theta_{SD}$ and the HD error angles $\Delta\theta_{HD12}$, $\Delta\theta_{HD23}$, and $\Delta\theta_{HD34}$, which are obtained with respect to each piece of the learning pair data, simply correspond to each other for each class. In the learning section 113, similarly to the case in the learning section 79 of FIG. 13, it is possible to integrate records in the error angle table. That is, in the learning section 113, a plurality of records in which the SD error angles $\Delta\theta_{SD}$ and the HD error angles $\Delta\theta_{HD12}$, $\Delta\theta_{HD23}$, and $\Delta\theta_{HD34}$ are similar are detected from the records of the error angle table, and the plurality of records can be integrated as one record.

Here, whether or not the SD error angles $\Delta\theta_{SD}$ in certain two records are similar can be determined by determining, for example, the absolute difference value between the SD error angles $\Delta\theta_{SD}$ in those two records and by determining whether or not the absolute difference value is less than or equal to a predetermined threshold value. Furthermore, whether or not the HD error angles $\Delta\theta_{HD12}$, $\Delta\theta_{HD23}$, and $\Delta\theta_{HD34}$ in certain two records are similar can be determined by determining, for example, the total sum of the absolute difference values of the HD error angles $\Delta\theta_{HD12}$, $\Delta\theta_{HD23}$, and $\Delta\theta_{HD3}$ in those two records and by determining whether or not the total sum is less than or equal to a predetermined threshold value.

As a method for integrating a plurality of records into one record, a method similar to the above-described method for integrating a plurality of records of the error table of FIG. 15 into one record may be employed.

Next, between the SD error angle $\Delta\theta_{SD}$ and each of the HD error angles $\Delta\theta_{HD12}$, $\Delta\theta_{HD23}$, and $\Delta\theta_{34HD}$, there is a relationship similar to that between the SD error distance $D_p$ and the HD error distance $D_q$ described with reference to FIG. 16. Therefore, as each of the HD errors $\Delta q_1$, $\Delta q_2$, $\Delta q_3$, and $\Delta q_4$ is approximated using a function in which the SD errors $\Delta p_1$ and $\Delta p_2$ are arguments, each of the HD error angles $\Delta\theta_{HD12}$, $\Delta\theta_{HD23}$, and $\Delta\theta_{HD34}$ can also be approximated using a function in which the SD error angle $\Delta\theta_{SD}$ is an argument.

More specifically, for example, it is assumed that the HD error angle $\Delta\theta_{HD12}$ is denoted as $\Delta\theta_{HD}$, and that this HD error angle $\Delta\theta_{HD}$ is predicted (approximated) by a first-order equation, in which the SD error angle $\Delta\theta_{SD}$ is an argument, for example, defined by coefficients "a" and "b", shown in the following equation:

$$\Delta\theta'_{HD} = a \cdot \Delta\theta'_{SD} + b \qquad (13)$$

Then, if, for a certain class, the i-th SD error angle $\Delta\theta_{SD}$ and HD error angle $\Delta\theta_{HD}$, which are stored in the learning section 113 of FIG. 24, are denoted as $\Delta\theta_{SD}(i)$ and $\Delta\theta_{HD}(i)$, respectively, and if the predictive value of the i-th HD error angle $\Delta\theta_{HD}(i)$ determined in accordance with equation (13) is denoted as $\Delta\theta_{HD}'(i)$, a predictive error $e_i$ between the i-th HD error angle $\Delta\theta_{HD}$ and predictive value $\Delta\theta_{HD}'(i)$ is expressed by the following equation:

$$\begin{aligned} e_i &= \Delta\theta_{HD}(i) - \Delta\theta'_{HD}(i) \\ &= \Delta\theta_{HD}(i) - (a \times \Delta\theta_{SD}(i) + b) \end{aligned} \qquad (14)$$

Parameter control data "a" and "b" which minimize (the total sum of) the square errors, represented by the following equation, of the predictive error $e_i$ of equation (14) is determined by the least square method:

$$E = \sum_{i=1}^{N} e_i^2 \qquad (15)$$

In equation (15) (the same applies to equations (16) to (21) to be described later), N indicates the number of sets of the SD error angle $\Delta\theta_{SD}$ and the HD error angle $\Delta\theta_{HD}$, which are stored, for a certain class, in the learning section 113 of FIG. 24.

Initially, when the square error of equation (15) is partially differentiated by the coefficients "a" and "b", the following equation is obtained:

$$\frac{\partial E}{\partial a} = -2\sum_{i=1}^{N} \Delta\theta_{SD}(i)(\Delta\theta_{HD}(i) - (a \cdot \Delta\theta_{SD}(i) + b)) \qquad (16)$$

$$\frac{\partial E}{\partial b} = 2\sum_{i=1}^{N} (\Delta\theta_{HD}(i) - (a \cdot \Delta\theta_{SD}(i) + b)) \qquad (17)$$

Since the minimum value (local minimum value) of the square errors of equation (15) is given by "a" and "b" which makes the right side of equations (16) and (17) to be 0, if the right sides of equations (16) and (17) are each substituted by 0, equation (18) is obtained from equation (16), and equation (19) is obtained from equation (17).

$$N \sum_{i=1}^{N} \Delta\theta_{SD}(i) \cdot \Delta\theta_{HD}(i) = Nb \sum_{i=1}^{N} \Delta\theta_{SD}(i) + Na \sum_{i=1}^{N} (\Delta\theta_{SD}(i))^2 \quad (18)$$

$$Nb - \sum_{i=1}^{N} \Delta\theta_{HD}(i) - a \sum_{i=1}^{N} \Delta\theta_{SD}(i) \quad (19)$$

By substituting equation (19) in equation (18), the coefficient "a" can be determined by the following equation:

$$a = \frac{N \sum_{i=1}^{N} \Delta\theta_{SD}(i) \cdot \Delta\theta_{HD}(i) - \left(\sum_{i=1}^{N} \Delta\theta_{SD}(i)\right)\left(\sum_{i=1}^{N} \Delta\theta_{HD}(i)\right)}{N \sum_{i=1}^{N} (\Delta\theta_{SD}(i))^2 - \left(\sum_{i=1}^{N} \Delta\theta_{SD}(i)\right)^2} \quad (20)$$

The coefficient "b" can be determined by the following equation:

$$b = \frac{\sum_{i=1}^{N} \Delta\theta_{HD}(i) - a \sum_{i=1}^{N} \Delta\theta_{SD}(i)}{N} \quad (21)$$

In the learning section 113 of FIG. 24, in the manner described above, learning for determining, for each class, the coefficients "a" and "b" which define equation (13) for each of the HD error angles $\Delta\theta_{HD12}$, $\Delta\theta_{HD23}$, and $\Delta\theta_{HD34}$ can be performed.

In this case, in the learning section 113, a coefficient table for each class, shown in, for example, FIG. 27, of the coefficients "a" and "b" determined for each of the HD error angles $\Delta\theta_{HD12}$, $\Delta\theta_{HD23}$, and $\Delta\theta_{HD34}$, is generated.

Here, in FIG. 27, the coefficients "a" and "b" for determining an HD error angle $\Delta\theta_{HDij}$ are indicated by $a_{ij}$ and $b_{ij}$, respectively, where (i, j)=(1, 2), (2, 3), and (3, 4).

In the learning section 113, when the coefficient table for each class, shown in FIG. 27, is determined, this coefficient table for each class is stored as the correction information in the correction information storage section 101 of FIG. 23.

Then, in the correction information storage section 101, the coefficient table of the class code #C, which is supplied from the clustering section 2 (FIG. 1), is read, and this table is supplied to the correction angle estimation section 103. In the correction angle estimation section 103, (the predictive values of) the HD error angles $\Delta\theta_{HD12}'$, $\Delta\theta_{HD23}'$, and $\Delta\theta_{HD34}'$ are determined by calculating equation (13) by using the coefficient table of the class code #C and the SD error angle $\Delta\theta_{SD}$ supplied from the feature extraction section 42, and they are supplied, as the correction levels, to the data correction section 5.

Next, FIG. 28 shows a fifth example of the configuration of the correction level calculation section 4 and the data correction section 5 of FIG. 1. Components in FIG. 28, which correspond to those in FIG. 11 or 19, are designated with the same reference numerals, and in the following, descriptions thereof are omitted where appropriate. That is, in FIG. 28, the correction level calculation section 4 is configured in such a way that, in addition to the clustering codebook storage section 41, the feature extraction section 42, and the HD error estimation section 43 of FIG. 11, the SD angle storage section 81, the feature extraction section 82, and the correction angle estimation section 83 of FIG. 19 are provided. Furthermore, in FIG. 28, the data correction section 5 is configured in such a way that, in addition to the addition section 51 of FIG. 11, the rotation section 91 of FIG. 19 is provided, and furthermore, an HD angle computation section 121 and a change section 122 are newly provided.

In the embodiment of FIG. 28, in the clustering codebook storage section 41, the feature extraction section 42, and the HD error estimation section 43, similarly to the case in FIG. 11, the HD error vector ($\Delta q_1$, $\Delta q_2$, $\Delta q_3$, $\Delta q_4$) is estimated, and this vector is supplied to the addition section 51 of the data correction section 5.

Similarly to the case in FIG. 11, the addition section 51 adds the HD error vector ($\Delta q_1$, $\Delta q_2$, $\Delta q_3$, $\Delta q_4$) from the HD error estimation section 43 to the HD code vector ($Q_1$, $Q_2$, $Q_3$, $Q_4$) supplied from the data generation section 3 (FIG. 1), thereby correcting the HD code vector ($Q_1$, $Q_2$, $Q_3$, $Q_4$) to the HD correction vector ($q_1'$, $q_2'$, $q_3'$, $q_4'$) (=($Q_1+\Delta q_1$, $Q_2+\Delta q_2$, $Q_3+\Delta q_3$, $Q_4+\Delta q_4$)).

Figure 29A:
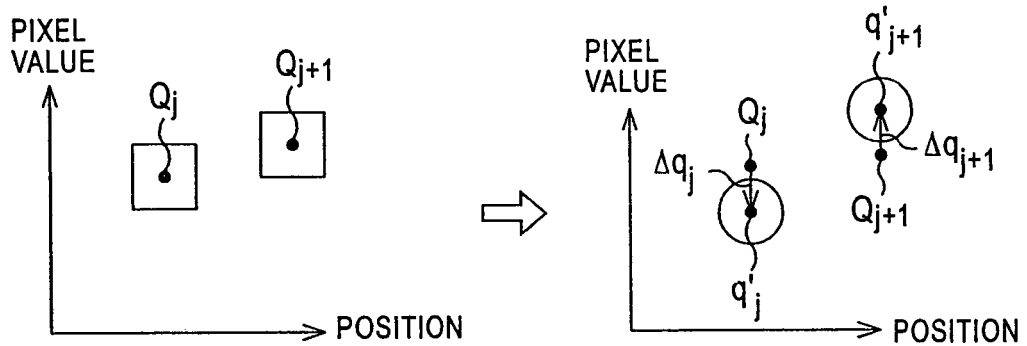
FIG. 29A illustrates processing in the correction level calculation section 4 and the data correction section 5.

Therefore, for example, when certain two adjacent HD pixels $Q_j$ and $Q_{j+1}$ among the HD code vector ($Q_1$, $Q_2$, $Q_3$, $Q_4$) is considered, in the addition section 51, as shown in FIG. 29A, the pixel value of the HD pixel $Q_j$ is corrected to an HD pixel $q_j'$ such that $\Delta q_j$ is added to the pixel value of the original HD pixel $Q_j$, and the pixel value of the HD pixel $Q_{j+1}$ is corrected to an HD pixel $q_{j+1}'$ such that $\Delta q_{j+1}$ is added to the pixel value of the original HD pixel $Q_{j+1}$.

The corrected HD pixels $q_j'$ and $q_{j+1}'$ are supplied from the addition section 51 to the change section 122.

On the other hand, in the SD angle storage section 81, the feature extraction section 82, and the correction angle estimation section 83, similarly to the case in FIG. 19, the HD error angle $\Delta\theta_{HD}$ is estimated, and this angle is supplied to the rotation section 91 of the data correction section 5.

In the rotation section 91, similarly to the case in FIG. 19, the HD pixel $Q_{j+1}$ is corrected by rotating the straight line $Q_j Q_{j+1}$ connecting the adjacent HD pixels in the HD code vector ($Q_1$, $Q_2$, $Q_3$, $Q_4$) supplied from the data generation section 3 (FIG. 1), for example, by an HD error angle $\Delta\theta_{HD}$ about the HD pixel $Q_j$. Here, the corrected HD pixels $Q_{j+1}$ is denoted as $q_{j+1}''$.

Furthermore, the rotation section 91 supplies the straight line $Q_j q_{j+1}''$ connecting the corrected straight line, that is, the HD pixels $Q_j$ and $q_{j+1}''$, to the HD angle computation section 121, and the HD angle computation section 121 determines an angle $\theta_{HD}''$ indicating the inclination of the straight line $Q_j q_{j+1}''$ supplied from the rotation section 91.

Figure 29B:
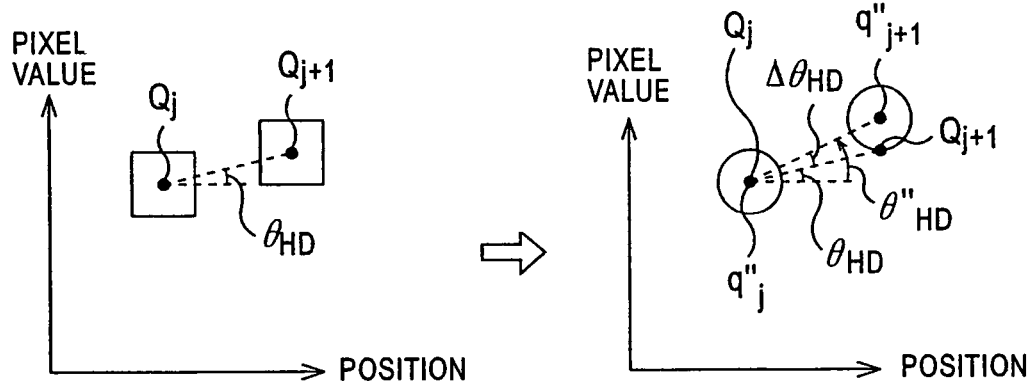
FIG. 29B illustrates processing in the correction level calculation section 4 and the data correction section 5.

More specifically, for example, as shown in FIG. 29B, if the HD angle indicating the inclination of the straight line $Q_j Q_{j+1}$ is denoted as $\theta_{HD}$ and the HD error angle supplied from the correction angle estimation section 83 is denoted as $\Delta\theta_{HD}$, in the HD angle computation section 121, the angle $\theta_{HD}+\Delta\theta_{HD}$ is determined as the angle $\theta_{HD}''$ indicating the inclination of the straight line $Q_j q_{j+1}''$, and this angle is supplied to the change section 122.

Figure 29C:
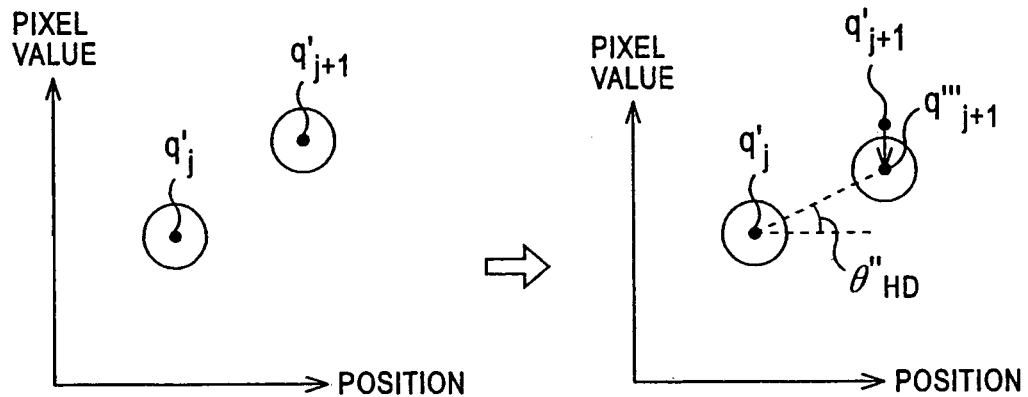
FIG. 29C illustrates processing in the correction level calculation section 4 and the data correction section 5.

In the change section 122, as shown in FIG. 29C, the angle indicating the inclination of the straight line $q_j' q_{j+1}'$ connecting the HD pixels $q_j'$ and $q_{j+1}'$ supplied from the addition section 51 is corrected so as to match the angle $\theta_{HD}''$ supplied from the HD angle computation section 121.

Here, in FIG. 29C, the straight line $q_j'q_{j+1}'$ connecting the HD pixels $q_j'$ and $q_{j+1}'$ supplied from the addition section 51 is rotated about the HD pixel $q_j'$, and the angle indicating the inclination thereof is denoted as $\theta_{HD}''$. Thus, the HD pixel $q_{j+1}'$ is corrected to the HD pixel $q_{j+1}''$.

The rotation center of the straight line $q_j'q_{j+1}'$ connecting the HD pixels $q_j'$ and $q_{j+1}'$ supplied from the addition section 51 may be the HD pixel $q_j'$ on the left side, as described with reference to FIG. 22, and may also be, for example, $q_{j+1}'$ on the right side, and the middle point of the two HD pixels $q_j'$ and $q_{j+1}'$.

Furthermore, in the embodiment of FIG. 28, the correction level calculation section 4 of FIGS. 11 and 19 may be replaced with the correction level calculation section 4 of FIGS. 12 and 23.

As described above, HD image data is generated based on the class of the class tap extracted from the SD image data, whereas the features of the class tap are detected based on the class tap and the class thereof, based on the features, the correction level for correcting the HD image data is determined, and based on the correction level, the HD image data is corrected. Therefore, it is possible to determine a correction level having a high accuracy, and furthermore, clustering makes it possible to obtain HD image data having a quality higher than that of the original SD image data.

The above-described series of processes can be performed by hardware, and can also be performed by software. In a case where the series of processes is performed by software, programs which form the software are installed into a general-purpose computer, etc.

Figure 30:
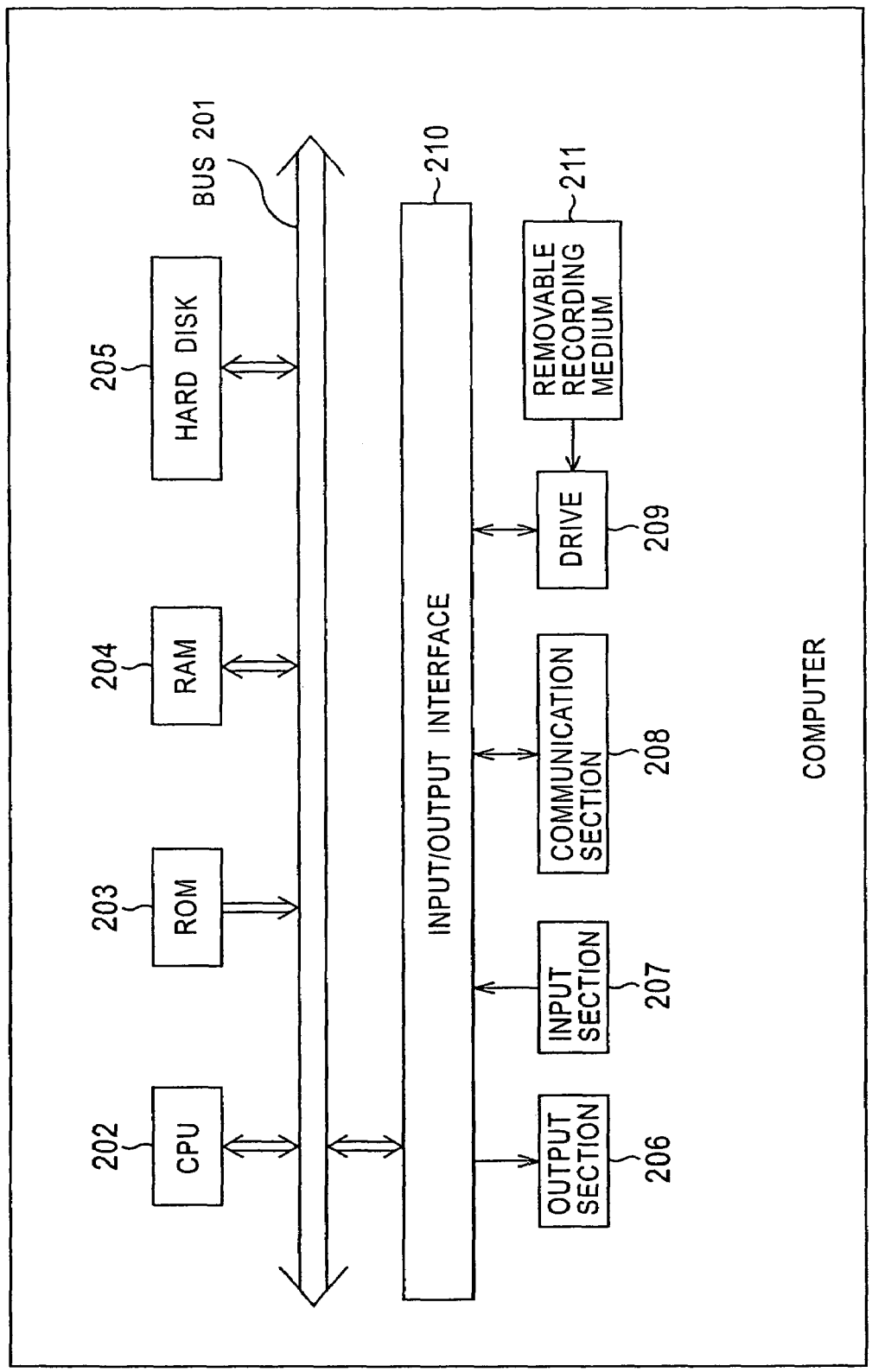
FIG. 30 is a block diagram showing an example of the configuration of an embodiment of a computer to which the present invention is applied.

Accordingly, FIG. 30 shows an example of the configuration of an embodiment of a computer into which a program for executing the above-described series of processes is installed.

Program may be recorded in advance in a hard disk 205 and a ROM 203 as recording media incorporated in the computer.

Alternatively, programs may be temporarily or permanently stored (recorded) in a removable recording medium 211, such as a flexible disk, a CD-ROM (Compact Disc Read Only Memory), an MO (Magneto optical) disk, a DVD (Digital Versatile Disc), a magnetic disk, or a semiconductor memory. Such a removable recording medium 211 may be provided as commonly called packaged software.

In addition to being installed into a computer from the above-described removable recording medium 211, programs may be transferred in a wireless manner from a download site via an artificial satellite for digital satellite broadcasting or may be transferred by wire to a computer via a network, such as a LAN (Local Area Network) or the Internet, and in the computer, the programs which are transferred in such a manner are received by a communication section 208 and can be installed into the hard disk 205 contained therein.

The computer has contained therein a CPU (Central Processing Unit) 202. An input/output interface 210 is connected to the CPU 202 via a bus 201. When an instruction is input as a result of an input section 207 including a keyboard, a mouse, a microphone, etc., being operated by a user via the input/output interface 210, the CPU 202 executes a program stored in a ROM (Read Only Memory) 203. Alternatively, the CPU 202 loads, into a RAM (Random Access Memory) 204, a program stored in the hard disk 205, a program which is transferred from a satellite or a network and which is received by the communication section 208 and is installed into the hard disk 205, or a program which is read from the removable recording medium 211 loaded into a drive 209 and is installed into the hard disk 205, and executes the program. As a result, the CPU 202 performs processes in accordance with the above-described flowcharts or processes to be performed according to the above-described block diagrams. Then, the CPU 202 outputs the processed result, for example, from an output section 206 including an LCD (Liquid-Crystal Display), a speaker, etc., via the input/output interface 210, as necessary, or transmits the processed result from the communication section 208 or records it in the hard disk 205.

In this specification, the processing steps describing the program by which the computer performs various processes do not have to be executed chronologically according to the written orders in flowcharts, and they may include processes which are executed concurrently or individually (for example, concurrent processes or object-oriented processes).

The program may be processed by one computer, and may also be processed in a distributed manner by a plurality of computers. Furthermore, the program may be transferred to a distant computer, whereby the program may be executed.

In this embodiment, in the clustering section 2, although a class tap is clustered by performing vector quantization on the class tap, the clustering technique is not limited to the vector quantization. That is, the clustering can be performed by the above-described ADRC process, etc.

In this embodiment, in the data conversion device of FIG. 1, although SD image data is converted into HD image data having a higher quality, in the data conversion device of FIG. 1, in addition, for example, audio data can be converted into audio data having a higher sound quality.

Furthermore, in this embodiment, although SD image data is converted into HD image data whose number of pixels is increased, that is, into HD image data whose spatial resolution is improved, in addition, the SD image data can also be converted into HD image data whose resolution in the time direction (the number of frames or fields) is improved or into HD image data whose resolution in the level direction (the number of bits assigned to a pixel value) is improved.

The data conversion device of FIG. 1 can be applied to, for example, a television receiver for receiving television broadcasting signals and displaying images, a DVD playback device for playing back and outputting image data from a DVD, a VTR for playing back and outputting image data from a video tape, and other image processing devices.

INDUSTRIAL APPLICABILITY

As has thus been described, according to the present invention, clustering makes it possible to obtain data having a quality higher than that of the original data.

The invention claimed is:

1. A learning device for learning correction information for determining the correction amount for correcting second data obtained by converting first data into said second data, which has a quality higher than that of said first data, said learning device comprising:

learning-pair data generation means for generating learning-pair data, which is a combination of teacher data corresponding to said second data, which serves as a teacher for learning, and student data corresponding to said first data, which serves as a student for learning;

clustering means for clustering said student data into one of a plurality of classes;

first relationship computation means for determining a first relationship between said student data and first representative data with regard to said first data, the first representative data representing the class of the student data;

second relationship computation means for determining a second relationship between teacher data corresponding to said student data and second representative data with regard to said second data, the second representative data representing the class of the student data; and learning means for learning said correction information in which said first and second relationships correspond to each other.

2. A learning device according to claim 1, wherein said first relationship computation means determines, as said first relationship, a first error, with respect to said student data, of first representative data with regard to said first data, which represents the class of said student data, and said second relationship computation means determines, as said second relationship, a second error, with respect to said teacher data corresponding to said student data, of second representative data with regard to said second data, the second representative data representing the class of said student data.

3. A learning device according to claim 1, wherein said first relationship computation means determines, as said first relationship, an angle representing a first error in the rate of change of the first representative data with regard to said first data, the second representative data representing the class of said student data, with respect to the rate of change of said student data, and said second relationship computation means determines, as said second relationship, an angle representing a second error in the rate of change of second representative data with regard to said second data, the second representative data representing the class of said student data, with respect to the rate of change of said teacher data corresponding to said student data.

4. A learning device according to claim 1, wherein said clustering means includes:

storage means for storing, for each of said plurality of classes, assignment information in which a class code representing the corresponding class is assigned to the first representative data with regard to said first data, the first representative data representing each class; and distance computation means for determining, based on said assignment information, the distance between said student data and each of the first representative data of said plurality of classes and for outputting a class code assigned to said first representative data that minimizes the distance.

5. A learning device according to claim 1, wherein said first and second data are image data.

6. A learning method for learning correction information for determining a correction amount for correcting second data obtained by converting first data into said second data having a quality higher than that of said first data, said learning method comprising:

a learning-pair data generation step of generating learning-pair data, which is a combination of teacher data corresponding to said second data, which serves as a teacher for learning, and student data corresponding to said first data, which serves as a student for learning;

a clustering step of clustering said student data into one of a plurality of classes;

a first relationship computation step of determining a first relationship between said student data and first representative data with regard to said first data, the first representative data representing the class of the student data;

a second relationship computation step of determining a second relationship between teacher data corresponding to said student data and second representative data with regard to said second data, the second representative data representing the class of the student data; and a learning step of learning said correction information in which said first and second relationships correspond to each other.

7. A program, encoded on a computer readable medium, for allowing a computer to perform a learning process for learning correction information for determining a correction amount for correcting second data obtained by converting first data into said second data having a quality higher than that of said first data, said program comprising:

a learning-pair data generation step of generating learning-pair data, which is a combination of teacher data corresponding to said second data, which serves as a teacher for learning, and student data corresponding to said first data, which serves as a student for learning;

a clustering step of clustering said student data into one of a plurality of classes;

a first relationship computation step of determining a first relationship between said student data and first representative data with regard to said first data, the first representative data representing the class of the student data;

a second relationship computation step of determining a second relationship between teacher data corresponding to said student data and second representative data with regard to said second data, the second representative data representing the class of the student data; and a learning step of learning said correction information in which said first and second relationships correspond to each other.

8. A computer readable medium having recorded thereon a program for allowing a computer to perform a learning process for learning correction information for determining a correction amount for correcting second data obtained by converting first data into said second data having a quality higher than that of said first data, said program comprising:

a learning-pair data generation step of generating learning-pair data, which is a combination of teacher data corresponding to said second data, which serves as a teacher for learning, and student data corresponding to said first data, which serves as a student for learning;

a clustering step of clustering said student data into one of a plurality of classes;

a first relationship computation step of determining a first relationship between said student data and first representative data with regard to said first data, the first representative data representing the class of the student data;

a second relationship computation step of determining a second relationship between teacher data corresponding to said student data and second representative data with regard to said second data, the second representative data representing the class of the student data; and a learning step of learning said correction information in which said first and second relationships correspond to each other.

* * * * *